United States Patent
Munro et al.

(10) Patent No.: US 9,898,918 B2
(45) Date of Patent: *Feb. 20, 2018

(54) TREADMILL BELT WEAR NOTIFICATION SYSTEM

(71) Applicant: Precor Incorporated, Woodinville, WA (US)

(72) Inventors: Daniel L. M. Munro, Monroe, WA (US); Mark Albright, Snohomish, WA (US); Tormay J Brown, Everett, WA (US); Doug Durnford, Mill Creek, WA (US); Gregory B May, Seattle, WA (US); Blakely T Pennington, Lake Stevens, WA (US); Cynthia Tremblay, Renton, WA (US); Richard W Whitbeck, Marysville, WA (US)

(73) Assignee: Precor Incorporated, Woodinville, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/250,657

(22) Filed: Aug. 29, 2016

(65) Prior Publication Data
US 2016/0371958 A1   Dec. 22, 2016

Related U.S. Application Data

(63) Continuation of application No. 14/656,640, filed on Mar. 12, 2015, now Pat. No. 9,430,920.

(Continued)

(51) Int. Cl.
*G08B 21/18* (2006.01)
*G08B 5/38* (2006.01)
(Continued)

(52) U.S. Cl.
CPC ............ *G08B 21/187* (2013.01); *A63B 22/02* (2013.01); *A63B 23/035* (2013.01); *A63B 24/0087* (2013.01); *A63B 71/0622* (2013.01); *G06Q 10/0639* (2013.01); *G08B 5/38* (2013.01); *G08B 21/182* (2013.01); *A63B 21/0051* (2013.01);
(Continued)

(58) Field of Classification Search
CPC . A63B 22/02; A63B 22/0664; A63B 22/0605; A63B 22/0056; A63B 22/0235; A63B 22/0023; A63B 22/0076; A63B 22/04; A63B 23/035; A63B 2071/0625; A63B 2071/065; A63B 2071/0658; A63B 2022/002; A63B 2022/0676; A63B 24/0087; A63B 24/0075; G08B 21/187; G08B 5/38

See application file for complete search history.

(56) References Cited

U.S. PATENT DOCUMENTS 3,964,039 A   6/1976   Craford et al.
4,350,336 A   9/1982   Hanford
(Continued)

*Primary Examiner* — Glenn Richman
(74) *Attorney, Agent, or Firm* — Terence P. O'Brien; Todd A. Rathe

(57) ABSTRACT

Belt wear of a treadmill is monitored. In one implementation, samples of electric current draw of a treadmill at different speeds of the treadmill belt of the treadmill are received. A value of each sample is differently weighted based on a speed of the treadmill belt at which the value of each sample was obtained. A belt wear notification is output based on the different weighted values of the samples.

20 Claims, 11 Drawing Sheets

Related U.S. Application Data

(60) Provisional application No. 61/952,053, filed on Mar. 12, 2014.

(51) Int. Cl.

| | | |
|---|---|---|
| *A63B 22/02* | (2006.01) | |
| *A63B 23/035* | (2006.01) | |
| *A63B 24/00* | (2006.01) | |
| *A63B 71/06* | (2006.01) | |
| *G06Q 10/06* | (2012.01) | |
| *A63B 22/06* | (2006.01) | |
| *A63B 22/00* | (2006.01) | |
| *H04L 12/70* | (2013.01) | |
| *A63B 21/005* | (2006.01) | |
| *A63B 21/015* | (2006.01) | |
| *A63B 21/078* | (2006.01) | |
| *A63B 22/04* | (2006.01) | |

(52) U.S. Cl.
CPC ......... *A63B 21/0058* (2013.01); *A63B 21/015* (2013.01); *A63B 21/078* (2013.01); *A63B 22/0023* (2013.01); *A63B 22/0056* (2013.01); *A63B 22/0076* (2013.01); *A63B 22/0235* (2013.01); *A63B 22/04* (2013.01); *A63B 22/0605* (2013.01); *A63B 22/0664* (2013.01); *A63B 24/0075* (2013.01); *A63B 2022/002* (2013.01); *A63B 2022/0676* (2013.01); *A63B 2071/065* (2013.01); *A63B 2071/0625* (2013.01); *A63B 2071/0658* (2013.01); *A63B 2207/02* (2013.01); *A63B 2220/10* (2013.01); *A63B 2220/58* (2013.01); *A63B 2220/72* (2013.01); *A63B 2225/10* (2013.01); *A63B 2225/107* (2013.01); *A63B 2225/20* (2013.01); *A63B 2225/30* (2013.01); *A63B 2225/305* (2013.01); *A63B 2225/50* (2013.01); *H04L 2012/5625* (2013.01)

(56) References Cited

U.S. PATENT DOCUMENTS

| | | | |
|---|---|---|---|
| 4,388,589 A | | 6/1983 | Molldrem, Jr. |
| 4,583,086 A | | 4/1986 | Andrews et al. |
| 4,591,147 A | | 5/1986 | Smith et al. |
| 4,635,927 A | * | 1/1987 | Shu .................. A63B 22/025 318/376 |
| 4,974,831 A | | 12/1990 | Dunham |
| 4,983,955 A | | 1/1991 | Ham, Jr. et al. |
| 5,007,630 A | | 4/1991 | Real et al. |
| 5,085,426 A | | 2/1992 | Wanzer et al. |
| 5,163,885 A | | 11/1992 | Wanzer et al. |
| 5,184,988 A | | 2/1993 | Dunham |
| 5,302,162 A | | 4/1994 | Pasero |
| 5,336,144 A | | 8/1994 | Rodden |
| 5,383,828 A | | 1/1995 | Sands et al. |
| 5,454,772 A | | 10/1995 | Rodden |
| 5,516,471 A | | 5/1996 | Sands et al. |
| 5,708,060 A | | 1/1998 | Sands et al. |
| 5,709,632 A | | 1/1998 | Socwell |
| 5,726,911 A | | 3/1998 | Canada et al. |
| 5,852,351 A | | 12/1998 | Canada et al. |
| 5,856,736 A | * | 1/1999 | Rotunda ........... H02M 7/53875 318/802 |
| 5,897,461 A | | 4/1999 | Socwell |
| 5,900,804 A | | 5/1999 | Yewell |
| 5,939,991 A | | 8/1999 | Deng |
| 6,013,011 A | | 1/2000 | Moore et al. |
| 6,055,145 A | | 4/2000 | Lagree et al. |
| 6,179,753 B1 | | 1/2001 | Barker et al. |
| 6,297,742 B1 | | 10/2001 | Canada et al. |
| 6,402,741 B1 | | 6/2002 | Keppel et al. |
| 6,478,720 B1 | | 11/2002 | Barker |
| 6,572,513 B1 | | 6/2003 | Whan-Tong et al. |
| 6,589,138 B2 | | 7/2003 | Dyer et al. |
| 6,846,274 B2 | | 1/2005 | Lopez-Santillana et al. |
| 6,906,503 B2 | | 6/2005 | Lopez-Santillana et al. |
| 6,942,602 B1 | | 9/2005 | Barker |
| 6,945,913 B2 | | 9/2005 | Moore et al. |
| 7,071,589 B2 | | 7/2006 | Bramel et al. |
| 7,156,777 B2 | | 1/2007 | Dyer et al. |
| 7,397,267 B2 | | 7/2008 | Wang |
| 7,507,187 B2 | | 3/2009 | Dyer et al. |
| 7,814,804 B2 | * | 10/2010 | Topel .................. A63B 22/0235 73/862.08 |
| 7,938,027 B2 | * | 5/2011 | Topel .................. A63B 22/0235 73/760 |
| 7,938,755 B1 | | 5/2011 | Dyer et al. |
| 7,988,599 B2 | * | 8/2011 | Ainsworth ............. A63B 24/00 482/1 |
| 8,040,071 B2 | | 10/2011 | Lin et al. |
| 8,221,292 B2 | | 7/2012 | Barker et al. |
| 8,384,554 B1 | | 2/2013 | Curtis |
| 8,884,553 B2 | | 11/2014 | Hai |
| 9,140,727 B2 | | 9/2015 | Hai |
| 9,418,349 B2 | | 8/2016 | Ainsworth et al. |
| 2003/0234729 A1 | | 12/2003 | Shen |
| 2009/0251836 A1 | | 10/2009 | Jonsson |
| 2015/0377947 A1 | | 12/2015 | Hai |

\* cited by examiner

TREADMILL BELT WEAR NOTIFICATION SYSTEM

CROSS-REFERENCE TO RELATED PATENT APPLICATIONS

The present application is a continuation application claiming priority from U.S. patent application Ser. No. 14/656,640 filed on Mar. 12, 2015 by Munro et al. and entitled TREADMILL BELT WEAR NOTIFICATION, which claims priority from U.S. Provisional Application Ser. No. 61/952,053 filed on Mar. 12, 2014, the full disclosures both of which is hereby incorporated by reference. The present application is related to co-pending U.S. patent application Ser. No. 14/656,609 filed on Mar. 12, 2015 by Munro et al. and entitled FITNESS EQUIPMENT UNIT SERVICE CONDITION NOTIFICATION SYSTEM, the full disclosure of which is hereby incorporated by reference.

BACKGROUND

The dynamic friction on a belt-deck interface of the treadmill (the region where the treadmill belt contacts the deck under a runner's foot) has a large impact on the amount of current consumed by the treadmill during use. As a the belt and deck wear over time, this dynamic friction increases and the amount of current consumed by the treadmill increases. Once the current increases beyond a certain threshold, a circuit breaker in the treadmill or a circuit breaker in the distribution panel of the gym may trip. In some cases, prior to a circuit breaker being tripped, the treadmill can throw a high current fault and stop the belt. All three of such cases result in temporary loss of function of the treadmill, interruption in the runner's work out and the need to service the treadmill to regain function.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF EXAMPLES

Figure 1:
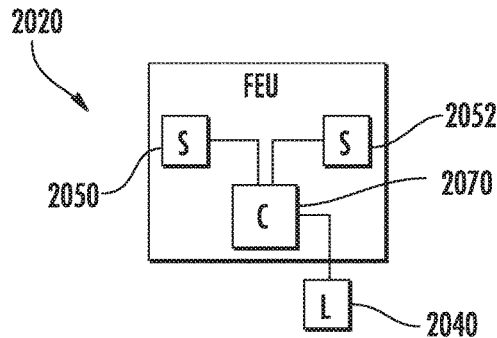
FIG. 1 is a schematic diagram of an example fitness equipment unit have an example notification system.

FIG. 1 schematically illustrates fitness equipment unit 2020, a fitness equipment unit that comprises another implementation of a notification system to assist owners, fitness or health club operators and managers in the management of the fitness of the unit. Fitness equipment unit 2020 comprises a notification system that notifies health club workers, managers, attendees are other fitness equipment unit monitoring individuals of maintenance and servicing issues with respect to fitness equipment unit 2020. The notification system of fitness equipment unit 2020 not only identifies when the fitness equipment unit 2020 is no longer operating or operational, but preemptively notifies the manager or other monitoring individual of a need for inspection or service prior to the fitness equipment unit 2020 reaching a completely inoperable state.

In one implementation, the notification system of fitness equipment unit 2020 does not require the manager or other monitoring individual to possess a separate computing device or to employ a wired or wireless network connection. In one implementation, the notification system of fitness equipment unit 2020 does not require the manager or other monitoring individual to access any special menus on the fitness equipment unit or to enter any special access codes to learn of service issues with respect to fitness equipment unit 2020. In one implantation, the notification system of fitness equipment unit 2020 facilitates quick and easy identification of a servicing issue as well as the severity of the servicing issue from a distance from the fitness equipment unit 2020, allowing the monitoring individual to simply walk around a health club and quickly and easily visually inspect multiple fitness equipment units.

Fitness equipment unit 2020 comprises an individual unit or machine configured to facilitate or assist a person in exercising. Fitness equipment unit 2020 may assist in either cardiovascular or strength conditioning exercise. Examples of fitness equipment unit 2020 include, but are not limited to, elliptical machines, stair steppers or climbers, treadmills, adaptive motion machines, rowing machines, bench press machines, upright and recumbent cycles, cross trainers, strength training equipment and the like.

Fitness equipment unit 2020 comprises light 2040, sensors 2050, 2052 and controller 2070. Light 2040 emits visible wavelengths of electromagnetic radiation to indicate a status of fitness equipment unit 2020. For example, in one implementation, a light emitter can emit a blue light, another light emitter can emit a red light, and a third light emitter can emit a third color. In one implementation, light 2040 generates different colors of light. In another implementation, light 2040 generates a white light, wherein each of the different states of light 2040 utilizes or positions a different filter over the white light such that light 2040 emits a different color of light as a result of the different filters. In one implementation, light 2040 includes a diffusion covering which diffuses the generated light to illuminate an expansive area of the treadmill 10 or in the vicinity of the treadmill. In one implementation, light 2040 includes a light focusing or concentrating covering which focuses the generated light onto a distinct predefined location or region.

In one implementation, light 2040 is additionally configured to emit light in a controlled fashion. For example, in one implementation, light 2040 emits light in a continuous fashion when on or in intermittent or flashing fashion when on. In one implementation, light 2040 comprises multiple different light emitters, wherein the frequency of each light emitter is different than the rest and is fixed, but wherein different light emitters are selectively actuated emit light at different frequencies. In one implementation, the frequency of light emitted by light 2040 is adjustable and is under the control of controller 2070. In one implementation, different color, frequencies or intensities of light can be used to indicate different combinations or states of the treadmill health or status. In one implementation, light 2040 comprises a tricolor light emitting diode actuatable between different colors and different frequency or flashing states. In yet another implementation light 2040 comprises a plurality of different light emitting elements located are collected at a single location, together with one another, that emit different colors or brightness is of light.

In one implementation, light 2040 is physically supported by fitness equipment unit 2020. In one implementation, light 2040 is physically supported by fitness equipment unit 2020 out of view of the person exercising on fitness equipment unit 2020, yet plainly visible from afar to those individuals walking around or about fitness equipment unit 2020. As a result, light 2040 notifies managers or other fitness equipment unit monitoring individuals of service issues while being inconspicuous to those persons exercising on the FEU 2020 so as not to alarm those persons exercising. In one implementation, light 2040 is physically located on the front of the fitness equipment unit 2020 and is visible from 50 feet away to allow a manager or other club representative to quickly assess the state of rows of exercise machines. The LED can be mounted on a circuit board containing a small microcontroller that receives commands from the motor controller module, which receives the master commands from a console of fitness equipment unit 2020.

In one implementation, light 2040 is located beneath a deck, seat or other structure upon which the person exercising resides, where the structure blocks view of light 2040 from the person exercising, but wherein those individuals walking around fitness equipment unit 2020 may view light 2040 from a distance (e.g. the front or the side of the FEU). For example, in implementations where fitness equipment unit 2020 comprises a treadmill, light 2040 is located beneath a treadmill deck, such as beneath a front of the treadmill deck or beneath a rear of the treadmill deck. In implementations where fitness equipment unit 2020 comprises an elliptical or adaptive motion machine, light 2040 is positioned beneath rear frame or structure. In yet other implementations, light 2040 is in view of the person exercising as well as those monitoring the fitness equipment unit 2020.

Sensors 2050, 2052 comprise independent sensors that sense or detect different parameters of fitness equipment unit 2020 and output signals that indicate different independent functional or service conditions of fitness equipment unit 2020. Examples of parameters that sensors 2050, 2052 detect include, but are not limited to, temperature, position, electrical current, voltage and the like. Such parameters indicate different service conditions of fitness equipment unit 2020. A functional or service condition is an error state or status for fitness equipment unit 2020 that pertains to a general function that is carried out by the fitness equipment unit 2020 and that may require servicing in the form of repair, replacement or adjustment.

For example, fitness equipment unit 2020 comprises a motor or actuator that carries out the function of moving components relative to one another. A treadmill utilizes a motor to drive a treadmill belt upon which a person walks or runs. A treadmill may additionally include another motor to adjust an incline of the treadmill belt. An elliptical machine or adaptive motion machine utilizes a motor or actuator to adjust the braking resistance provided by an Eddy brake, to adjust step height and/or stride length or to adjust an inclined ramp or track. Parameters such as temperature, position, current or voltage may indicate a service condition for the motor/actuator.

Fitness equipment unit 2020 further comprises sensors 2050, 2052 which may become defective. Fitness equipment unit 2020 comprises a processor, part of controller 2070, and the processor may become faulty. Fitness equipment unit, upon being installed or after service, requires each of several components to be properly connected to one another. Likewise, fitness equipment unit 2020 may include components or parts that wear as a result of natural use over time. For example, in implementations where fitness equipment unit 2020 comprises a treadmill, the belt of the treadmill is often subject to wear such that the belt requires periodic replacement. In another implementation, the treadmill deck may wear along with the belt (or separately from the belt) and require service. Each of these service conditions including the examples of processor error, sensor error, motor/actuator error, part wear or connection error, may result in fitness equipment unit 2020 becoming inoperable or requiring service or maintenance.

With current fitness equipment units, managers may not become immediately aware of a service condition. Often, such managers do not become aware of a service condition until the fitness equipment unit is completely inoperable and the inoperability of the fitness equipment unit is brought to the attention of the manager by a member of the health club who is frustrated by the breakdown. When an FEU such as a cardio exercise machines is out-of-order, it can frustrate users and raises a source of concern for fitness club operators. Club operators or other representatives desire readily accessible feedback regarding the status of their FEUs, such as whether the FEU is fully operational or requires service in the near future, or immediately. In many existing treadmill configurations, when a treadmill is in need of service, it is not known or obvious to the user or to the club operator until the treadmill fails during use or an error is evident upon attempting to start the treadmill. In such scenario, the treadmill must be taken out of service or the operator must make a note that service is needed. To preemptively monitor fitness equipment units to ensure that unexpected breakdowns do not occur during normal club hours requires the manager or other attendee to individually inspect each fitness equipment unit by working their way through a display menu and series of prompts to access a specialized menu to first see if there are any error codes. If there are error codes, the attendee must then discern the actual meaning of the error codes being displayed to determine the identity and severity of the service condition.

Controller 2070 serves as part of a notification system that allows the manager or health club attendee to quickly and easily identity the service state of fitness equipment unit as well as the severity of any service condition that may exist without having to individually inspect each and every fitness equipment unit at a facility by working through a series of display menus and prompts to access error codes which then must be discerned. At the same time, the manager or health club attendee is not bombarded with an array or series of multiple lights requiring the manager or health club attendee to specifically identify which light is being illuminated and what specific service condition is represented by each individual light. In contrast, controller 2070 congeals or boils down all of the different service conditions that may be concurrently present into a single indication, using light 2040, such that the manager or health club attendee may quickly and easily discern the basics of whether action is needed and what action is needed. In particular, controller 2070 actuates light 2040 between different states based upon a combination of multiple different service conditions. In one implementation, controller 2070 actuates light 2040 between different colors and different flashing states to simply indicate the service status of fitness unit 2020; whether (A) no action is needed, (B) fitness equipment unit 2020 has undergone an error, but has automatically recovered from the error such that the fitness equipment unit 2025 continues to be operable, but inspection is recommended, (C) that maintenance is required, such as through replacement of a worn part, but where the fitness equipment unit continues to be operable, and (D) the fitness equipment unit is presently inoperable.

Figure 2:
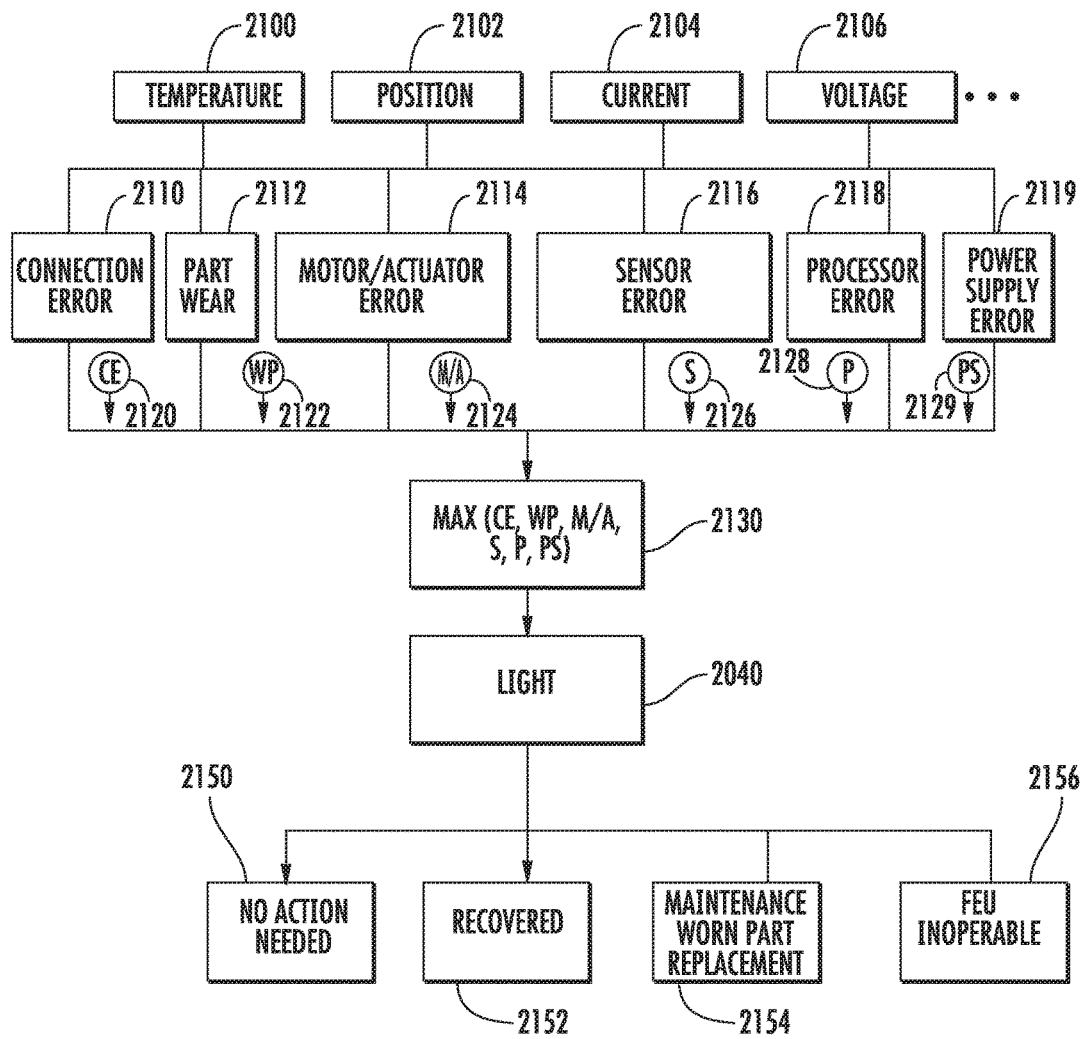
FIG. 2 is a flow diagram of an example notification method that may be carried out by the fitness equipment unit of FIG. 5.

FIG. 2 is a functional flow diagram illustrating operation of controller 2070 part of a notification system that notifies managers or other health club attendants of the current general service status for fitness equipment unit 2020. As indicated by blocks 2100, 2102, 2104 and 2106, controller 2070 receives signals from sensors of fitness equipment unit 2020, such as sensors 2050, 2052, wherein such signals indicate parameters such as a sensed temperature, a sensed position, a sensed electrical current, a sensed voltage and so on. As indicated by blocks 2110, 2112, 2114, 2116, 2118, 2119, controller 2070 analyzes such signals to identify the existence of service conditions with respect to fitness equipment unit 2020 as well as the severity of such service conditions.

As indicted by block 2110, controller 2070 utilizes signals from the sensor(s) of fitness a equipment unit 2020 to determine whether a connection error exists that may require servicing. A connection error occurs when two or more components are not connected or are not adequately connected. For example, a wire connection to a terminal may become loose over time. In one implementation, one of sensors 2050, 2052 detects a connection or disconnection of such components. When not properly connected or when disconnected, signals or outputs will indicate the misconnection to controller 2070. For example, when fitness equipment unit 2020 is installed, when replacement of a part is made or when an adjustment is made, reconnection of parts may be inadvertently complete. Such misconnection of parts may allow continued operation of fitness equipment unit 2020 or may render fitness equipment unit 2020 inoperable. Based upon the service condition, connection error, controller 2070 outputs a connection error service condition signal 2120 which indicates that either no action is needed, that operation may continue, but inspection is recommended or that the fitness equipment unit is inoperable due to the misconnection.

As indicated by block 2112, use of fitness equipment unit 2020 may result in certain parts or components becoming worn. The wearing of such parts is indicated by one or more of the parameters 2100, 2102, 2104, 2106. For example, use of a treadmill over time may result in wear of the treadmill belt. Wear of the treadmill belt is often indicated by an increase in the current being drawn by the motor that drives the belt. In one implementation, sensor 2050 (or sensor 2052) comprises a current sensor which senses the current draw by the treadmill, such as by sensing the mains current drawn by the treadmill, wherein the signals outputted by the current sensor indicate wear of the treadmill belt. In another implementation, sensor 2050 (or sensor 2052) comprises a current sensor which senses the current drawn by just the belt driving motor, wherein such signals output by the current sensor indicate wear of the treadmill belt. Based upon the service condition, wear of the part, controller 2070 outputs a part wear condition signal 2122 which indicates that either no action is needed, that operation may continue, but inspection is recommended or that the fitness equipment unit is inoperable due to the current level of wear of the part, such as the treadmill belt.

As indicated by block 2114, the actuator motor of fitness equipment unit 2020 may malfunction. In one implementation, sensor 2050 (or sensor 2052) may sense the positioning of one or more components of fitness equipment unit 2020 which are moved by the motor/actuator, wherein the signals indicating the position may indicate a service condition relating to malfunctioning of the motor or actuator. In other implementations, malfunctioning in the motor or actuator may be indicated by other parameters such as electric current being drawn by the treadmill (current parameter 2104) the voltage of the motor (parameter 2106) or the temperature of the motor (parameter 2100). Based upon such signals and associated parameters, controller 2070 determines whether a service condition exists and the severity of the service condition relating to the malfunctioning of the motor/actuator. For example, controller 2070 may determine that there is no service condition or the service condition fails to surpass a predetermined threshold such that no action is needed. Alternatively, controller 2070 may determine that an error condition or service condition has occurred, but was self-corrected by fitness equipment unit 2020, wherein operation the fitness equipment unit may continue, but wherein inspection or troubleshooting of the motor is recommended. Still other circumstances, controller 2070 may determine that the motor service condition is such that the fitness equipment unit 2020 is no longer operable in its current state. Based upon such determinations, controller 2070 outputs a motor/actuator malfunction service condition signal 2124.

As indicated by block 2116, one or more sensors of fitness equipment unit 2020 may malfunction. One or more of parameters 2100, 2102, 2104, 2106 output by working sensors may indicate such a service condition regarding one or more of the malfunctioning sensors. Upon determining that a sensor error service condition exists, controller 2070 outputs a sensor error service condition signal 2126. The sensor error service condition signal may indicate that no action is needed, that an error occurred but was recovered from or that the fitness equipment unit, as a result of the error, is inoperable.

As indicated by block 2118, one or more processors of fitness equipment unit 2020 may malfunction. One or more of parameters 2100, 2102, 2104, 2106 output by working sensors may indicate such a service condition regarding one or more of the malfunctioning processors. Upon determining that a processor error service condition exists, controller 2070 outputs a processor error service condition signal 2128. The processor error service condition signal may indicate that no action is needed, that an error occurred but was recovered from or that the fitness equipment unit, as a result of the error, is inoperable.

As indicated by block 2119, the supply of power, such as from a grid, may vary and may cause errors or problems with the operation of fitness equipment unit 2020. One or more of parameters 2100, 2102, 2104, 2106 output by working sensors may indicate such a service condition regarding the quality of the power being supplied to fitness equipment unit 2020. Upon determining that a power supply service condition exists, controller 2070 outputs a power supply service condition signal 2129. The power supply error service condition signal may indicate that no action is needed, that an error occurred but was recovered from or that the fitness equipment unit, as a result of the error, is inoperable.

As indicated by block 2130, controller 2070 receives each of the current or ongoing service condition signals 2120, 2122, 2124, 2126, 2128 and 2129. Controller 2070 bases its control of light 2040 upon a combination or aggregation of all of the possible service conditions that may be concurrently occurring. In other words, controller 2070 controls light 2040 to produce a single notification or actuation of light 2040 to a single state based upon an aggregation of all of the different ongoing service conditions. In the example illustrated, controller 2070 compares a severity of each of the service condition signals received to one another and identifies the most severe service condition signal or the service condition signal having the maximum severity. In other words, the status of the light defaults to the most significant or severe condition.

For example, if signal 2120 indicates that a loose connection (or a "no connection" error) is present but signal 2122 indicates that the part has worn and is in need of replacement, controller 2070 controls light 2040 based upon the most severe service condition, in this case that a part is worn and is in need of replacement. If signal 2122 indicates a part in needing of repair while signal 2124 indicates that an error rendering the fitness equipment unit 2020 inoperable, controller 2070 controls light 2040 based upon the most severe service condition, the fact that the motor/actuator error is rendering the fitness equipment unit 2020 inoperable. If signal 2124 indicates that no action is needed but signal 2126 indicates that fitness equipment unit 2020 did encounter an error which was automatically recovered, controller 2070 controls light 2040 based upon the most severe condition, the fact that an error did occur, but fitness equipment unit 2020 recovered from the error, resulting in recommended inspection. If two signals, for example, signal 2124 and 2126, have the same severity, controller 2070 controls light 2042 a single state representing both service conditions. In such a manner, controller 2070 provides health club managers or health club attendant with an easily identifiable notification of what action needs to be taken respect to the fitness equipment unit without the attendant having to work through a series of menus and screens on the fitness equipment unit, without the attendant having to have an access code and without the attendant having to have a separate computing device or knowledge of numerous complex error codes.

FIG. 2 illustrates four example states for light 2040 based upon the combination of different service condition signals that controller 2070 may derive or discern from the parameter signals received from the sensors of fitness equipment unit 2020. As indicated by block 2150, when none of the service condition signals indicate that action is needed, controller 2070 actuate light 2040 to a state corresponding to a "no action needed" state. In one implementation, controller 2070 actuates light 2040 to a continuous or constant blue light emitting state.

As indicated by block 2152, when the highest severity amongst the different service conditioning signals received by controller 2070 is that an error occurred with respect to fitness equipment unit 2020, from which fitness equipment unit 2020 has recovered and is now operating, controller 2070 can actuate light 2040 to a different state as compared state 2050, a second state. The different state indicated by light 2040 not only indicates that fitness equipment and 2020 underwent an error for which recovery is made, but that the manager or health club attendant should inspect fitness equipment unit 2020 and make needed adjustments or repairs to reduce a likelihood that the error once again occur which may result in the fitness equipment unit 2020 becoming inoperable. In one implementation, controller 2070 actuates light 2040 to a continuous yellow color to indicate an operational state following recovery from an error.

As indicated by block 2154, when the highest severity amongst the different service conditioning signals is that a part or component is sufficiently worn to merit replacement, controller 2070 actuates light 2040 to a third state. For example, in implementations where fitness equipment unit 2020 comprises a treadmill, the treadmill belt may become sufficiently worn to merit replacement. Upon determining such a need, controller 2070 actuates light 2042 the third state to indicate they needed replacement. In one implementation, controller 2070 actuate light 2040 to a flashing blue color to communicate such recommended replacement.

As indicated by block 2156, when at least one of the service conditions indicates that the fitness equipment unit 2020 is inoperable or should no longer be used, controller 2070 actuates light 2040 to a fourth state. In one implementation, controller 2070 actuates light 2040 to a flashing yellow color to indicate either the current interoperability of fitness equipment unit 2020 or that fitness equipment unit 2020 should be disabled until repair.

In the example illustrated, controller 2070 is illustrated as part of fitness equipment unit 2020. In other implementations, controller 2070 comprises a remote computing device. For example, in another implementation, controller 2070 may be located at a remote location, such as at a server across a local area network or wide area network, where the server receives service condition signals and performs a determination described above in block 2130. The server then transmits the signals from actuating light 2040 to one of the notification states 2150, 2152, 2154, 2156 based upon the results of the aggregation step carried out in block 2130.

Figure 3:
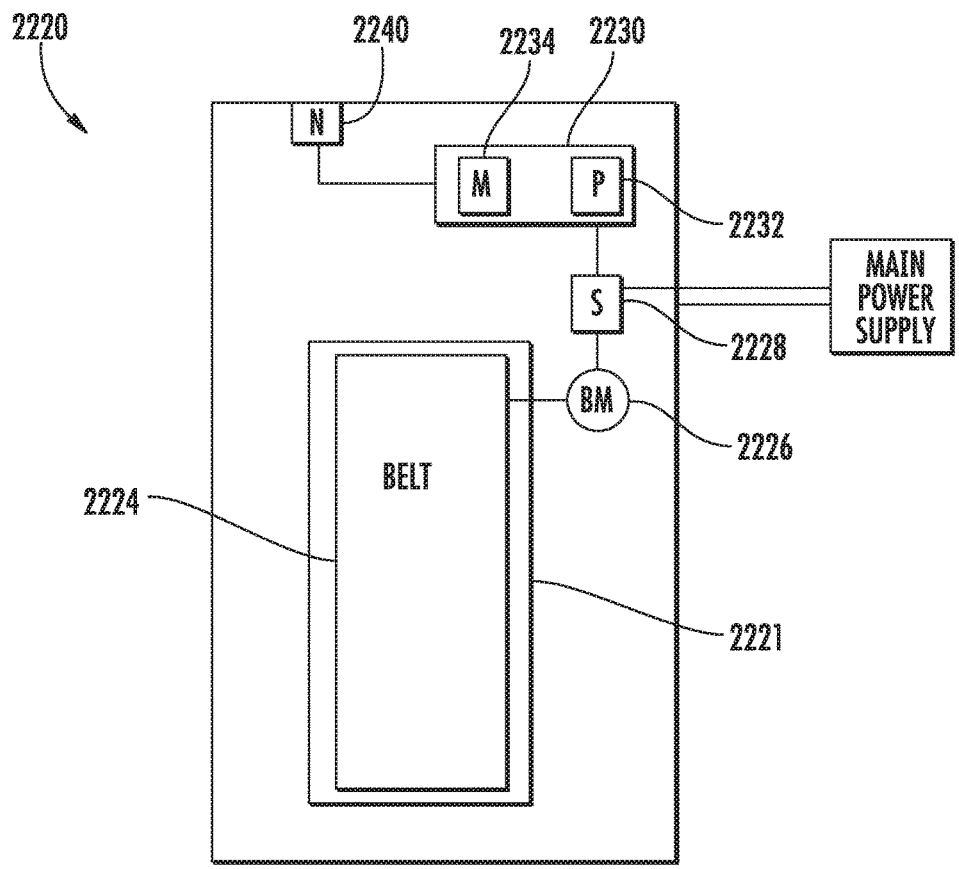
FIG. 3 is a schematic diagram of an example treadmill having an example belt wear notification system.

FIG. 3 schematically illustrates a particular example of fitness equipment unit 2020. Fitness equipment unit 2220 comprises a treadmill. Treadmills typically comprise a belt which is driven along a deck. The dynamic friction of the belt-deck interface on the treadmill (the region where the belt contacts the deck under a runner's foot or footfalls) has a large impact on the amount of current consumed by the treadmill during use. As the belt and deck wear over time, this dynamic friction increases and the amount of current consumed by the treadmill increases. Once the average current increases beyond a certain threshold, the circuit breaker in the treadmill or the circuit breaker in the distribution panel of the gym can trip. In some cases, prior to a circuit breaker trip, the treadmill can experience a high current fault and stop the belt. All three of the above cases can result in temporary loss of function of the treadmill, interruption in the runner's workout, and the need to service the treadmill to regain function. Further, in the above scenarios, the treadmill does not provide preemptive notification of a possible circuit breaker trip event.

Fitness equipment unit 2220 provides preemptive notification of belt wear and a possible circuit breaker trip event. Fitness equipment unit 2220 comprises deck 2221, treadmill belt 2224, belt motor 2226, electric current sensor 2228, controller 2230 and notifier 2240. Treadmill belt 2224 comprises a belt upon which a person walks, jogs or runs. Belt motor 2226 comprise a motor which drives rotation of belt 2224. Electric current sensor 2228 comprises a sensor associated with motor 2226 that outputs signals indicating electrical current being drawn by belt motor 2226.

Notifier 2240 comprises a device by which a person is notified regarding a service condition of fitness equipment unit 2220. In one implementation, notifier 2240 comprises a light, such as light 2040 described above. In another implementation, notifier 2240 comprises a notification upon a display screen of fitness equipment unit 2020. In yet another implementation, notifier 2240 comprises an auditory or audible signal. In still another implementation, notifier 2240 comprises a notification that is transmitted in a wired or wireless form to a separate electronic device, such as a personal data assistant, smart phone, tablet, notebook, Web server or the like.

Controller 2230 actuates notifier 2240 between different states. In one implementation, controller 2230 actuates notifier 2242 between different states based solely upon a determined level wear of belt 2224. In other implementations, controller 2230 actuates notifier 2240 to different states based upon a combination of multiple different service conditions such as described above with respect to light 2040 and service conditions 2110, 2112, 2114, 2116 and 2118, wherein service condition 2112 pertains to wear of belt 2224. Controller 2230 comprises processor 2232 and memory 2234. Processor 2232 comprises one or more processing units that, under the direction of instructions provided in memory 2234, determine a current level of wear of belt 2224, wherein the determined current level of wear of belt 2224 is further utilized by processor 2232 to output a service condition signal at least partially upon which the actuation of notifier 2240 is based.

For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 2230 may be embodied as part of one or more application-specific integrated circuits (ASICs). Unless otherwise specifically noted, the controller is not limited to any specific combination of hardware circuitry and software, nor to any particular source for the instructions executed by the processing unit.

Figure 4:
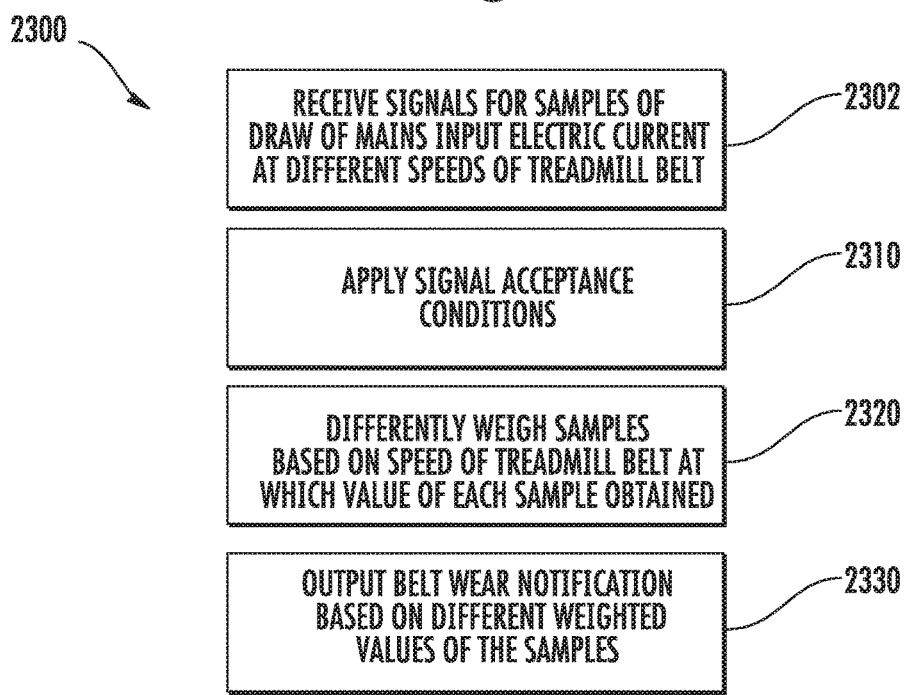
FIG. 4 is a flow diagram of an example method for identifying belt wear.

Memory 2234 comprises a non-transitory computer-readable medium containing software, code, program logic instructions for directing processor 2232 to carry out the determination of a level of wear of belt 2224, wherein the determined level of wear is used by controller 2230 as a basis for actuating notifier 2240. In one implementation, memory 2234 contains instructions for directing processor 2232 to carry out example method 2300 outlined in FIG. 4. As indicated by block 2302 in FIG. 4, instructions in memory 2234 direct processor 2232 to receive signals from sensor 2228 for samples of electric current draw of treadmill 2220 (electric current being drawn at or from the mains) at different speeds at which belt 2224 is driven during at least one individual workout. In an alternative implementation, samples of electric current draw of just belt motor 2226 at different speeds at which belt 2224 is driven during at least one individual work out are received. In one implementation, instructions in memory 2234 direct processor 2232 to continuously receive such electric current signals. In yet another implementation, instructions in memory 2234 direct processor 2232 to periodically poll and retrieve samples of electric current draw by treadmill 2220.

In one implementation, each sample of electric current draw comprises multiple amperage signals from sensor 2228 reflecting electrical current being drawn by treadmill 2220 over a predetermined period of time, wherein processor 2232 (or another processor) determines an average of electric current being drawn for the period of time. In one implementation, each sample spans a period of time that is at least equal to the time for a complete footfall by a person running on belt 2224. In one implementation, each sample of electric current draw comprises an average of electric current being drawn by treadmill 2220 for a period of time spanning at least two complete footfalls. By the period of time of the sample spanning at least one complete footfall, the impact of variations in electric current draw which occurs depending upon the stage of footfall, are accommodated. By the period of time of the sample spanning at least two complete footfalls, the impact of a sample cutting off the beginning or ending of a footfall is reduced. In one implementation each electric sample comprise an average of electric current for a period of time of at least 2 seconds and nominally at least 2.5 seconds for up to 30 seconds.

In one implementation, instructions in memory 2234 direct processor 2232 to receive the samples of electric current draw at 30 second intervals, once every 30 seconds. As a result, processor load is reduced. In other implementations, the samples of electric current are taken or received at other intervals or continuously.

As indicated by block 2310, instructions in memory 2234 further direct processor 2232 to apply one or more signal acceptance conditions. Such signal acceptance conditions either prevent or inhibit the retrieval of electric current signals from sensor 2228 or result in such selected signals being discarded or not used as part of the overall criteria for determining the level of belt wear or whether the current belt is in need of replacement. In one implementation, electric current signals received when a person is not walking, running or jogging upon belt 2224 are not accepted or are not used. For example, when a person is standing on the side frame portions on either side of the belt 2224 (but not on the belt), the electric current signals received from sensor 2228 are not utilized as part of the determination of belt wear. In some implementations, electrical current signals received when belt motor 2226 is driving belt 2224 at selected speeds are not accepted or are not utilized as part of the determination of belt wear. For example, in one implementation, electric current signals received from sensor 2228 while belt 2224 is being driven at a speed of less than 3.5 mph are not accepted or are not utilized. In one implementation, electric current signal received from sensor 2228 while belt 2224 is inclined, at an inclination setting of greater than zero, are not accepted or are not utilized. In some implementations, the electric current signals received from sensor 2228 while belt 2224 is inclined (at an inclination of greater than zero) are utilized as part of the determination of the current level of belt wear, wherein the values of such signals received during an inclined state of belt 2224 are weighted based upon the inclination. In other implementations, one or more such signal acceptance conditions are not applied.

As indicated by block 2320, memory 2234 directs processor 2232 to differently weigh the values of the samples of electric current (the average of electric current for each sample period of time) based upon the speed of the treadmill belt 2224 at which the value of each sample was obtained. In particular, as the individual electric current values are received, the current speed of belt 2224 is also determined or retrieved. The current speed of belt 2224 for the electric current values of the sample is then associated with the determined average of the electric current values for the particular sample time period. Each determined sample of electric current value will have an associated or corresponding belt speed.

Electric current draw at certain speeds of treadmill belt 2224 are more indicative of belt wear or more accurately reflect belt wear as compared to electric current draw at other speeds of treadmill belt 2224. Because controller 2230 differently weighs the values of the current samples based upon the speed of the treadmill belt in which the values of each sample were obtained, more accurate and reliable identification of belt wear is achieved.

In one implementation, different weighting factors are applied to the individual sample values based upon the speed at which such sample values were taken using a formula or equation, wherein the electrical current value of the sample is inputted into the formula or equation. In another implementation, each sample value within a particular range receives the same weighting factor. In another implementation, different weighting factors are applied indirectly to the sample values, such as after such sample values in a particular range have been averaged together, wherein the different weighting factors are applied to the average of the multiple sample values. In still other implementations, the multipliers or weighting factors are applied to other values derived from the sample values or after other multipliers or adjustments have been made to the sample values.

As indicated by block 2330, instructions in memory 2234 direct processor 2232 to output a belt wear notification based upon the different weighted values of the electric current samples. As noted above, in one implementation, controller 2230 actuates notifier 2240 between different states based solely upon the determined level of wear of belt 2224. In another implementation, controller 2230 actuates notifier 2240 between different states based upon a ranking or priority associated with multiple different service conditions, one of which is the current level of wear of belt 2224.

Figure 5:
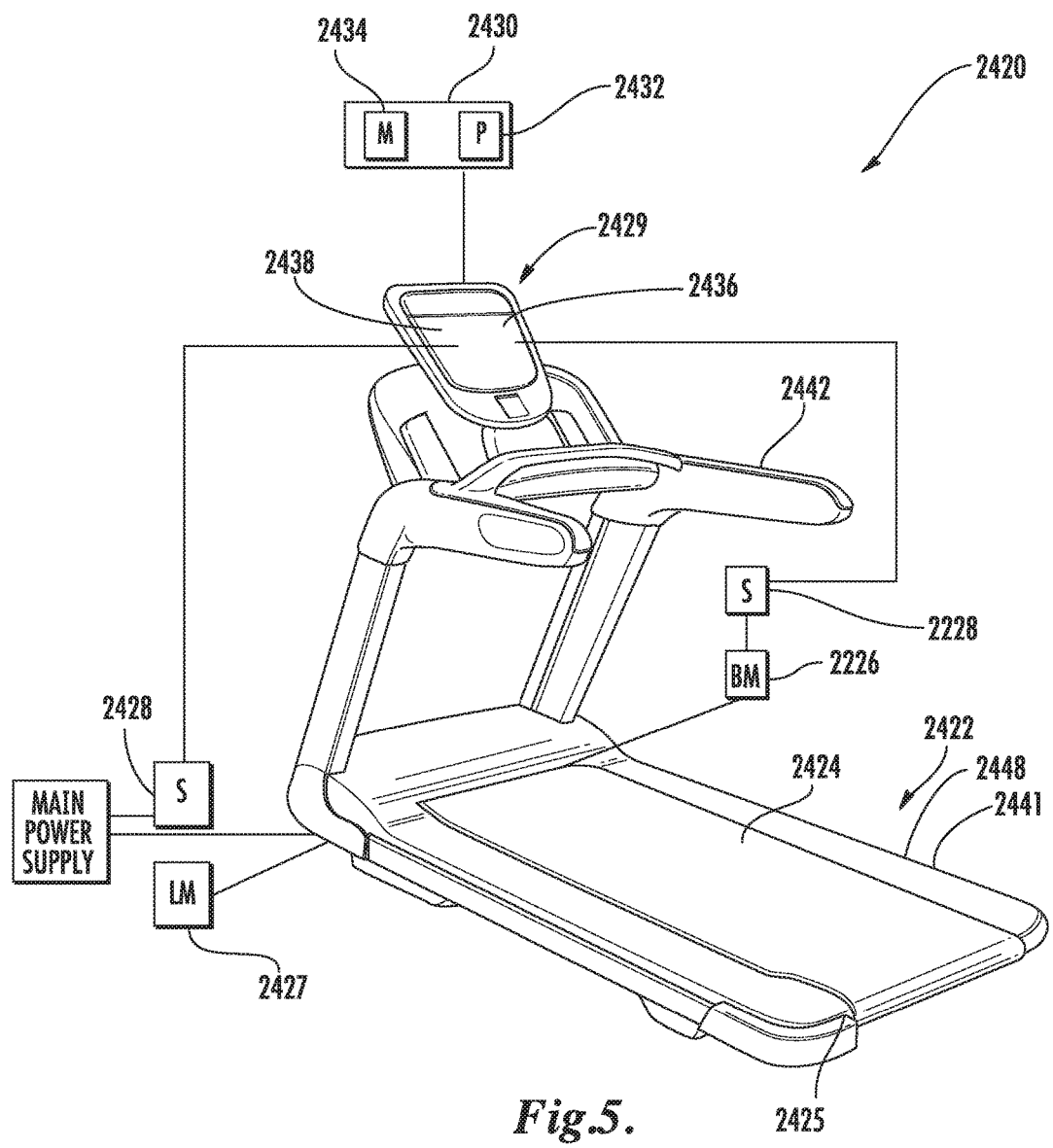
FIG. 5 is a rear perspective view of an example treadmill having an example notification system.
Figure 6:
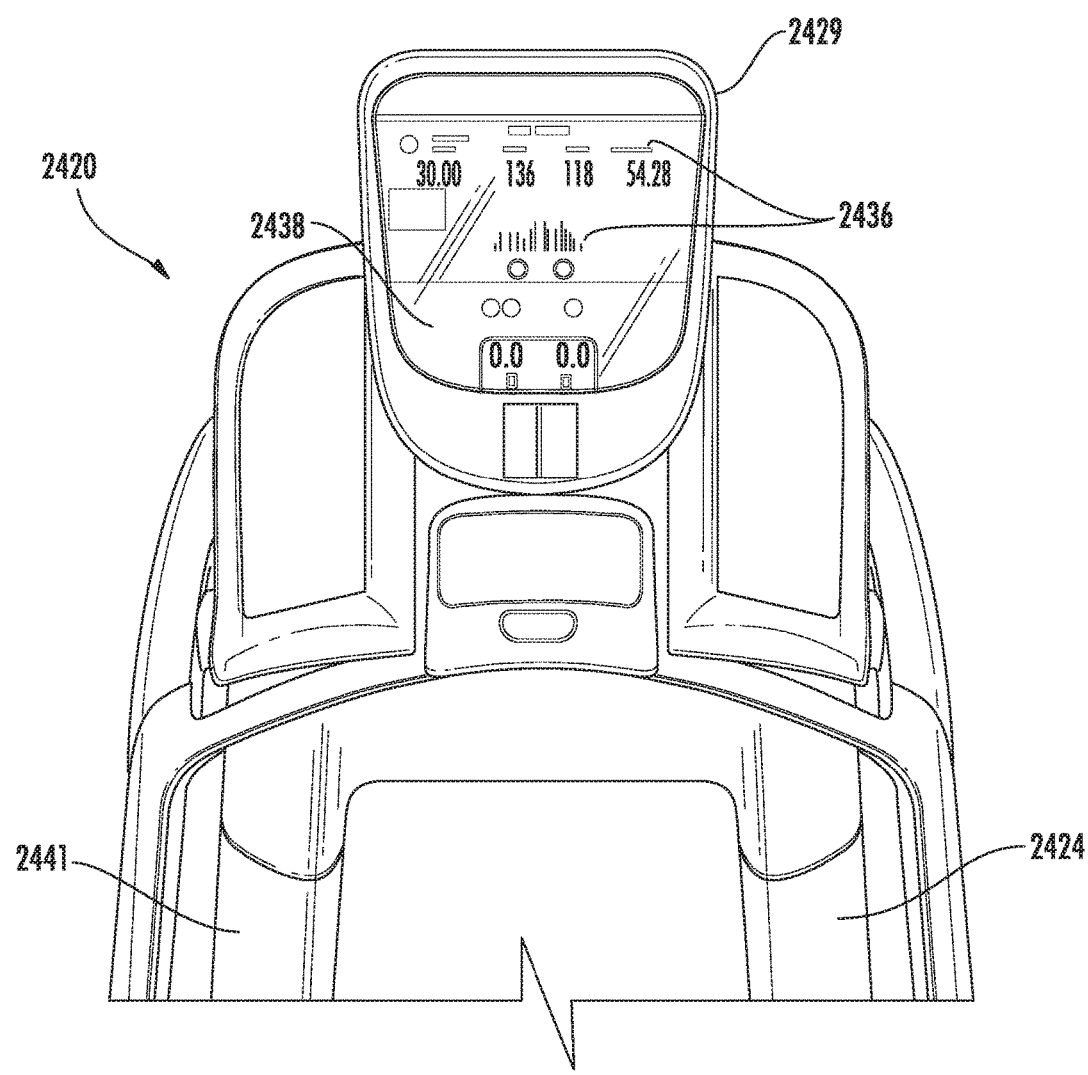
FIG. 6 is a fragmentary rear view of the treadmill of FIG. 5.
Figure 7:
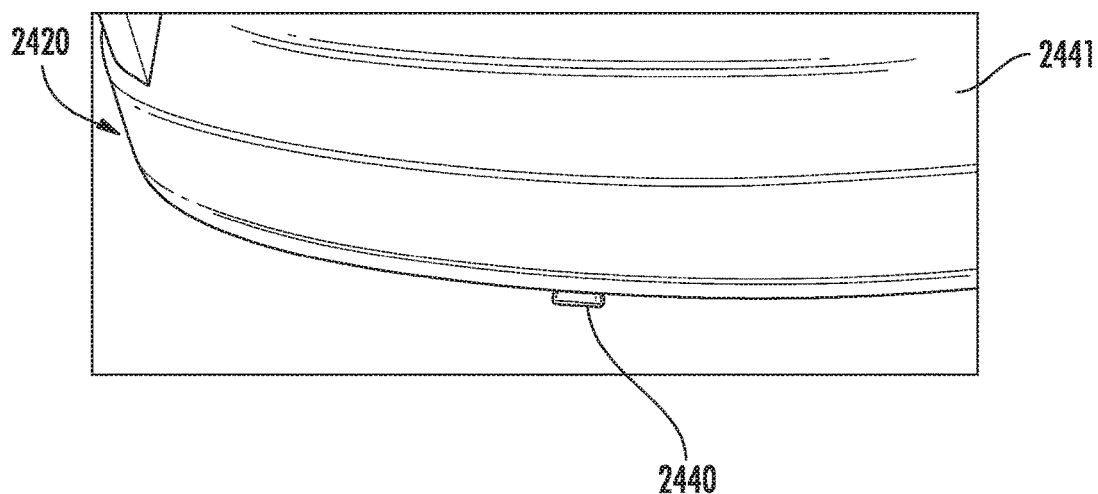
FIG. 7 is an enlarged front view of a portion of the treadmill of FIG. 5, illustrating an example notifier of the notification system.

FIGS. 5-7 illustrate treadmill 2420, a particular example of fitness equipment unit 2220. Treadmill 2420 comprises frame 2422, belt 2424, belt drive motor 2226, electric current sensor 2228, lift motor 2427, position sensor 2428, console 2429 and notifier 2440 (shown in FIG. 7). Frame 2422 comprises a structure which movably supports belt 2424 and console 2429. In the example illustrated, frame 2422 comprises deck 2425, lower platform 2441 and handrails 2442. Deck 2425 is a planar body that is overlapped by belt 2424. The upper surface of deck 2425 provides the surface that belt 2424 moves over during operation. Lower platform 2441 extends about belt 2424, in front of belt 2424 and along opposite sides of belt 2424 and includes side rails 2448, allowing a person to step off of belt 2424 and onto the side rails 2448. Handrails 2442 extend above lower platform 2441, allowing a person to manually hold onto or grip such handrails 2442 when needed. Belt 2424 is movably supported between side rails 2448 and wraps about a rear axle and a front axle (not shown). In one implementation, belt 2424 has a width of at least 20 inches and nominally 22 inches.

Belt drive motor 2226 and electric current sensor 2228 are described above with respect to fitness equipment unit 2220. Belt drive motor 2226 drives belt 2424. Sensor 2228 senses or otherwise outputs signals corresponding to the current amperage of electric current being drawn by the overall treadmill 2420 from the mains input current. In another implementation, electric current sensor 2228 alternatively senses just the electric current draw of the belt drive motor 2226, wherein this electric current draw is utilized to determine belt wear.

Lift motor 2427 comprises a motor operably coupled to treadmill belt 2424 so as to selectively raise and lower a front end of deck 2441 and/or treadmill belt 2424 to adjust an incline of treadmill belt 2424. Position sensor 2428 comprises a sensor that detects positioning of treadmill belt 2424 and/or lift motor 2427. Position sensor 2428 outputs position signals that may indicate a service condition with respect to lift motor 2427. In some implementations, lift motor 2427 and position sensor 2428 are omitted, such as where treadmill 2434 does not have an adjustable incline.

Console 2429 (shown in FIG. 6) extends above the front of treadmill 2420 and comprises controller 2430, display 2436 and input 2438. Display 2436 presents visible output or data to a person using treadmill 2420. Although illustrated as a series of LEDs, in other implementations, display 2436 comprises a display monitor. In one implementation of the display monitor further comprises a touch screen. Input 2438 comprise devices by which a person may enter information, commands or selections. In the example illustrated, input 2438 comprise one or more pushbuttons and touchpads. In other implementations input 2438 comprises graphical user interfaces or icons presented on a touchscreen, slider bars, dials, switches or other device by which inputs or commands are made.

Controller 2430 is provided as part of console 2429 and comprises processor 2432 and memory 2434. Processor 2432 is similar to processor 2232 in that processor 2432 comprises one or more processing units that carry out instructions provided by memory 2234. Memory 2434 is similar to memory 2234. Memory 2434 comprises a non-transitory computer-readable medium containing program logic, code, software or instructions that direct processor 2432 to determine or estimate a degree of wear of belt 2424 based at least in part upon electric current signals from sensor 2228 (or other current sensors).

Notifier 2440 (shown in FIG. 7) comprises a single light located beneath deck 2441 at a front of treadmill 2420, out of the view of a person running or otherwise exercising upon treadmill belt 2424. Because notifier 2440 is out of view of a person running on treadmill belt 2424, the light is less likely to alarm the person running or promulgate confusion or questioning with regard to the meaning of the light. In other implementations, light 2440 is located at other locations out of the view of a person exercising on treadmill 2420, such as beneath deck 2441 at a rear of treadmill 2420 or along the side of treadmill 2420, or on a backside of console 2429. In still other implementations, light 2440 is located in view a person exercising upon treadmill 2420, such as on a front of console 2429.

In the example illustrated, notifier 2440 comprises a tricolor light emitting diode actuatable between a flashing and a non-flashing state as well as different colors. In other implementations, notifier 2440 comprises a cluster or group of different light emitting elements that form the light. In yet other implementations, in lieu of a light, notifier 2440 comprises a graphic presented on display 2436 and/or an audible sound or signal.

In the example illustrated, controller 2430 actuates notifier 2440 to different states based upon an aggregation or combination of multiple different and independent service conditions, similar to fitness equipment unit 2020 described above. In the example illustrated, controller 2430 actuates notifier 2440 between different states at least based upon service conditions comprising belt wear and a lift error with regard to the motor and actuator that adjusts the incline of treadmill belt 2424.

Figure 8:
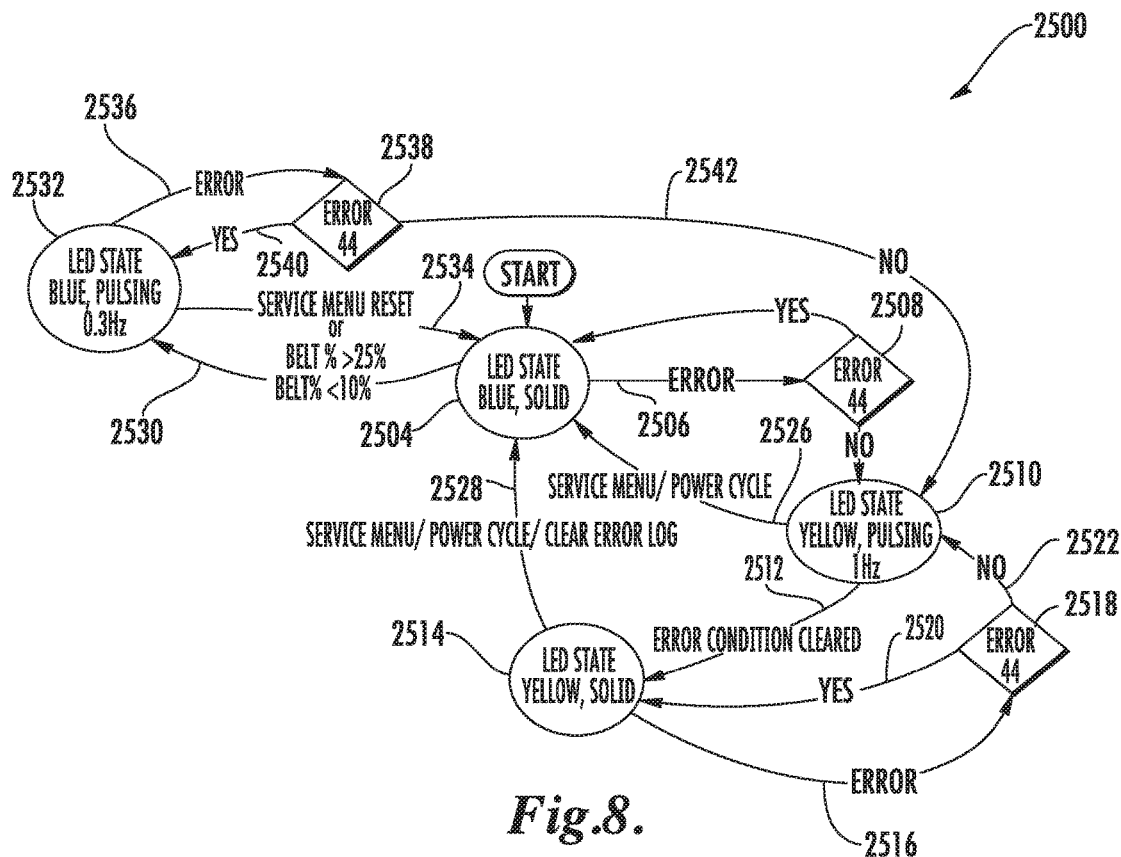
FIG. 8 is a flow diagram of an example notification method that may be carried out by the treadmill of FIG. 5.

FIG. 8 is a flow diagram of an example method 2500 that may be carried out by controller 2430 in controlling the state of notifier 2440. As shown by FIG. 8, controller 2430 initially actuates notifier 2440 to a default state, a continuous blue light emitting state 2504. As indicated by arrow 2506, controller 2430 receives notification of an error. In one implementation, an error log is used to track, store or contain the pieces of information relating to each error. In one implementation, the following information is captured: Error code; Hours; Odometer; Motor amps; Line amps; Line voltage and Motor controller buss voltage. Examples of various error signals are provided in the table below.

| | | | | ERROR List | | |
|---|---|---|---|---|---|---|
| Error # | Description | Proposed Action to Take | User Facing String | Stop?- Hard (H), Soft (S), No Stop (N) | Service LED Initial State | Service LED State After Recovery |
| none | Key Depressed at Power Up | Message until button is unstuck, then resume Power Up process, No Error is logged | | | Blue/No Change | Blue/No Change |
| 10 | Line Frequency out of Acceptable Range | Log the error, display the error to user, drive slows treadmill to a stop, console attempts to clear the error with the reset command | | S | Yellow/ Pulsing 1 Hz | Yellow/Solid |
| 11 | Watchdog (Upper PCA) Low Voltage | Log the error & reset (workout soft stops, gets logged, and gets reset | | S | Yellow/ Pulsing 1 Hz | Yellow/Solid |
| 12 | Watchdog (Lower PCA) Low Voltage | Log the error, display the error user, drive stops sending voltage to the motor, console attempts to clear the error with the reset command | | H | Yellow/ Pulsing 1 Hz | Yellow/Solid |
| 14 | Fan Fail (Lower PCA) | Log the error, display the error to user, drive slows treadmill to a stop, console attempts to clear the error with the reset command Note: The drive has a 3 sec delay before sending this error | | S | Yellow/ Pulsing 1 Hz | Yellow/Solid |
| 15 | Over-buss voltage/DC link voltage too high | Console logs the error, display the error to user, drive stops sending voltage to the motor, console attempts to clear the error with the reset command | | H | Yellow/ Pulsing 1 Hz | Yellow/Solid |

ERROR List -continued

| Error # | Description | Proposed Action to Take | User Facing String | Stop?-Hard (H), Soft (S), No Stop (N) | Service LED Initial State | Service LED State After Recovery |
|---|---|---|---|---|---|---|
| 16 | A.C. Input Voltage Too Low | Drive immediately stops sending voltage to the motor, console goes to pause state and scrolls the error once, console attempts to clear the error with the reset command, the error will not be stored in the log until the error has been present for longer than 15 seconds NOTE: The console will weight for 15 seconds from the time the first error 16 message was received before logging this error to prevent nuisance trips during a normal power cycle. | | H | Yellow/ Pulsing 1 Hz | Yellow/Solid |
| 19 | PFC Malfunction | Console logs the error, drive stops sending voltage to the motor, console attempts to clear the error with the reset command | | H | Yellow/ Pulsing 1 Hz | Yellow/Solid |
| 18 | DB Resistor thermal switch open | Log the error, display the error to user, drive slows the belt to a stop, console attempts to clear the error with the reset command and goes to PAUSE | | S | Yellow/ Pulsing 1 Hz | Yellow/Solid |
| 17 | DB Resistor thermal I2t trip | Log the error, display the error to user, drive slows the belt to a stop, console attempts to clear the error with the reset command and goes to PAUSE | | S | Yellow/ Pulsing 1 Hz | Yellow/Solid |
| 85 | No DB Resistor detected/DBR failed Open | Log the error, display the error to user, (this error is only checked on power-up, so it will never display to the user), | | N | Yellow/ Pulsing 1 Hz | Yellow/Solid |

-continued

| | | | | ERROR List | | | |
|---|---|---|---|---|---|---|---|
| Error # | Description | Proposed Action to Take | User Facing String | Stop?- Hard (H), Soft (S), No Stop (N) | Service LED Initial State | Service LED State After Recovery |
| 20 | Motor will not start/no motor movement detected | drive continues to operate normally, console attempts to reset this error. The drive only checks for and reports this error at startup. Log the error, display the error to user, go to pause state, drive continues to operate normally, console attempts to clear the error with the reset command | | N (the console goes to pause state) | Yellow/ Pulsing 1 Hz | Yellow/Solid |
| 25 | Lower Drive hardware error | Log the error, display the error user, drive slows treadmill to a stop, console attempts to clear the error with the reset command | | S | Yellow/ Pulsing 1 Hz | Yellow/Solid |
| 27 | Too Much Drive Motor Current | Console logs the error displays the error user, drive slows treadmill to a stop, console attempts to clear the error with the reset command | | S | Yellow/ Pulsing 1 Hz | Yellow/Solid |
| 28 | Temperature Too High/Drive Electronics | Log the error, display the error user, drive slows treadmill to a stop, console attempts to clear the error with the reset command, display requests PFC and Motor Controller module temperatures and MTH state ((mtmp) and (ptmp)), then logs temp. information in the error log. | | S | Yellow/ Pulsing 1 Hz | Yellow/Solid |
| 88 | Temperature Too High/Motor Temperature Switch | Log the error, display the error to the user, console attempts to clear the error with the reset command Note: Console is responsible for slowing the system to a stop in this case. It | | S | Yellow/ Pulsing 1 Hz | Yellow/Solid |

ERROR List

| Error # | Description | Proposed Action to Take | User Facing String | Stop?-Hard (H), Soft (S), No Stop (N) | Service LED Initial State | Service LED State After Recovery |
|---|---|---|---|---|---|---|
| | | should slow to a stop immediately after receiving the error Note: The drive will throw the fault immediately upon the motor thermal switch (MTH) opening. The drive will weight for 5 minutes before slowing the belt to a stop. | | | | |
| 35 | Excessive AC Input Current/ Instantaneous | Log the error, display the error user, drive stops sending voltage to the motor, concole attempts to clear the error with the reset command. The drive will clear this error upon receiving the reset command | | H | Yellow/ Pulsing 1 Hz | Yellow/Solid |
| 36 | Excessive AC Input Current/ Circuit Breaker Trip Prevention | Log the error, display the error user, drive slows treadmill to a stop, console attempts to clear the error with the reset command. The drive will clear this error upon receiving reset command. | | S | Yellow/ Pulsing 1 Hz | Yellow/Solid |

| Error # | Description | Proposed Action to Take | Stop?-Hard (H), Soft (S), No Stop (N) | Treadmill External LED Initial State | Service LED State After Recovery |
|---|---|---|---|---|---|
| 30 | Communications Error Downstairs to Upstairs | Displays weights for 2 seconds then goes to pause state, sends [mph:0], logs the error, display the error to user, attempt to recover communication (send [reset]) | S (console responsible for sending [mph:0] to ramp down | Yellow/ Pulsing 1 Hz | Yellow/Solid |

-continued

| Error # | Description | Proposed Action to Take | Stop?- Hard (H), Soft (S), No Stop (N) | Treadmill External LED Initial State | Service LED State After Recovery |
|---|---|---|---|---|---|
| 32 | Communications Error Upstairs to Downstairs | Log the error, display the error to user, send reset to drive to attempt recovery | S | Yellow/ Pulsing 1 Hz | Yellow/Solid |
| 37 | E-STOP Upper State vs. Lower State Mismatch After Settling Time | Log the error, display the error to user, must either cycle power or pull and reset the E-STOP to use unit again. Console tries to recover with reset. | S | Yellow/ Pulsing 1 Hz | Yellow/Solid |
| 40 | Lift Motion Not Detected | Log the error, display the error to user, workout continues, not resettable | N | Yellow/Solid There is a loss of a major function in this case | Yellow/Solid There is a loss of a major function in this case |
| 42 | Lift Position Value Out of Range | Log the error, display the error to user, workout continues, drive self-resets if potentiometer returns to valid range | N | Yellow/Solid There is a loss of a major function in this case | Yellow/Solid |
| 44 | Un-commanded Lift Motion | Log the error, display the error to user, workout continues, not resettable | N | Blue/No Change | Blue/No Change |
| 45 | Lift Moving in Wrong Direction | Log the error, display the error to user, workout continues, not resettable | N | Yellow/Solid There is a loss of a major function in this case | Yellow/Solid There is a loss of a major function in this case |
| 86 | Old Console Detected on New TM12 Drive | The old console will not start a workout, no error is displayed to the user, the error will be logged in the error log. | S | Blue/No Change | Blue/No Change |
| 87 | New TRM800-14 Console Detected on Old TM5 Drive | Log the error, display the error to user. | S | Yellow/ Pulsing 1 Hz (send this message but TM5 doesn't have an LED) | Yellow/Solid (console attempts to change LED, though it is not present) |
| 60 | Auto Stop Not Working | Not used on TRM800-14 | — | — | — |
| 61 | Auto Stop Not Present | Not used on TRM800-14 | — | — | — |
| 80 | Phase A or B missing/Incline Control | Log the error, display the error to user, workout continues, all requests for incline changes are ignored, requires power cycle to restore functionally, user can start a new workout but function will be limited as above | N | Yellow/Solid (loss of main function) | Yellow/Solid, sourced by console, cannot clear |

-continued

| Error # | Description | Proposed Action to Take | Stop?-Hard (H), Soft (S), No Stop (N) | Treadmill External LED Initial State | Service LED State After Recovery |
|---|---|---|---|---|---|
| 81 | Phase C missing/Incline Control | Log the error, display the error to user, workout continues, all requests for incline changes are ignored, requires power cycle to restore functionally, user can start a new workout but function will be limited as above | N | Yellow/Solid (loss of main function) | Yellow/Solid, sourced by console, cannot clear |
| 82 | Phase A or B missing/Speed Control | Log the error, display the error to user, workout continues, all requests for speed changes are ignored, requires power cycle to restore functionally, user can start a new workout but function will be limited as above, "PLEASE USE ANOTHER TREADMILL" is displayed at banner. | N | Yellow/ Pulsing 1 Hz | Yellow/ Pulsing 1 Hz sourced by console, cannot clear |
| 83 | Phase C missing/Speed Control | Log the error, display the error to user, workout continues, all requests for speed changes are treated as requests for speed reduction, requires power cycle to restore functionally, user can start a new workout but function will be limited as above, "PLEASE USE ANOTHER TREADMILL" is displayed at banner. | N | Yellow/ Pulsing 1 Hz | Yellow/ Pulsing 1 Hz sourced by console, cannot clear |

As indicated by arrow 2506, upon initially receiving an error signal identifying an error code, controller 2430 proceeds to decision block 2508 at which point controller 2430 determines whether or not the error code is for "error 44". As noted in the error identification list above, "Error 44" is an error signal that occurs when there is an "un-commanded lift motion" which results from sensor 2428 detecting movement of lift motor 2427 and/or deck 2422. In the example, controller 2430 can be instructed to ignore such error codes as such error codes are sometimes inadvertently triggered.

As a result, in cases of the error being "error 44", controller 2430 maintains notifier 2440 in the default solid blue light emitting state.

As shown by FIG. 8, if controller 2430 determines that there is not "error 44", controller 2430 actuates notifier 2440 to a yellow pulsing state 2510. A yellow pulsing state indicates to the fitness club attendees or managers that treadmill 2420 should not be used or is inoperable. As indicated by arrow 2512, in some instances, controller 2430 automatically corrects itself such that the error condition is cleared. As a result, controller 2430 actuates notifier 2442 to solid yellow light emitting state 2514. The solid yellow light emitting state 2514 indicates that there was an error, but treadmill 2420 automatically corrected itself. The historical error identified by the solid yellow state 2514 informs the attendee of the historical error and correction, suggesting that inspection may be appropriate.

As indicated by arrow 2516, decision point 2518 and arrow 2520, should another error be received while notifier 2440 is in the solid yellow state, controller 2430 determines whether the new error is "error 44". If the newly received error is error 44, controller 2430 maintains notifier 2440 and the solid yellow light emitting states 2514. Alternatively, if the newly received error is not error 44, controller 2430 once again returns notifier 2440 to the pulsing yellow light emitting states 2510 as indicated by arrow 2522.

As indicated by arrow 2526, if the error is remedied by servicemen or other individual while notifier 2440 is in the pulsing yellow light emitting state, and a service menu/power cycle has been implemented, controller 2430 returns notifier 2442 the default solid blue light emitting state 2510 indicating the no further action is needed. Likewise, as indicated by arrow 2528, once a serviceman has inspected treadmill 2420 and has made any necessary adjustments or repairs while notifier 2440 is in the solid yellow light emitting state 2514, such as a service/power cycle/clear error log is carried out, controller 2430 returns notifier 2440 to the solid blue light emitting state 2504.

As noted above, controller 2430 additionally controls notifier 2440 to indicate belt wear. As indicated by arrow 2530, in response to determining that in response to determining that belt wear has exceeded a predefined threshold, controller 2430 changes the state of notifier 2440 to a pulsing blue light emitting state 2532. In the example illustrated, controller 2430 actuates notifier 2440 to the pulsing blue light emitting state in response to determining that less than 10% of the initial or expected belt life remains. In other implementations, other thresholds are used or are selectable by a manager or owner of treadmill 2420. As indicated by arrow 2534, controller 2430 returns notifier 2440 in the default state 2504 in response to a service menu reset by the manager or in response to once again determining that the current level of belt wear is less than a predefined threshold. In the example illustrated, in response to determining that greater than 25% of the initial or expected life of a new belt remains, such as after a treadmill belt has been replaced, controller 2430 returns notifier 2440 to the default state 2504.

As indicated by arrow 2536, in response to receiving a service condition error while in the pulsing blue state 2532, controller 2430 determines whether the error is "error 44" at decision point 2538. If controller 2430 determines that what was received there is indeed an "error 44" controller 2430 maintains notifier 2440 in the pulsing blue light emitting states 2532 as indicated by arrow 2540. Alternatively, as indicated by arrow 2542, should controller 2430 determine that the received error signal is not for "error 44, controller 2430 actuates notifier 2442 the pulsing yellow light emitting state 2510.

As noted above, in the example illustrated, controller 2430 can be instructed to ignore "error 44". Upon receiving an error or service condition, controller 2430 checks to determine whether the error is "error 44", ignoring those instances when the error is error 44. In other implementations, such verification steps are omitted such as implementations where there is not an error signal for un-commanded lift movement or where such error signals are permitted to impact the state of notifier 2440.

Figure 9:
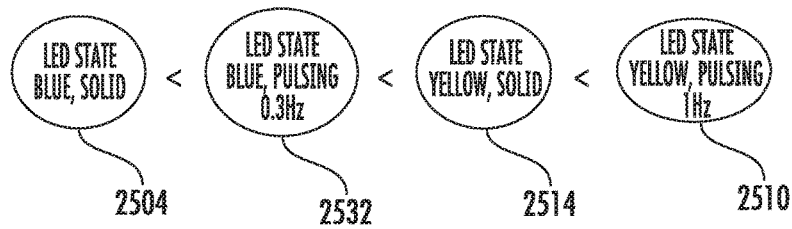
FIG. 9 is a diagram illustrating an example of service condition light notification priorities.

In the example illustrated, controller 2430 keeps track of which LED state it has sent to the service LED board, and prioritizes the color of the LED in the case that there are 2 or more events that change the color of the LED. As shown in the above flow diagram, controller 2430 carries out a prioritization with regard to the different states for notifier 2440. FIG. 9 diagrams the prioritization of the different states 2504, 2510, 2514 and 2532. Should multiple service conditions or errors occur at the same time, the service condition or error associated with the highest priority state controls to what state notifier 2440 is actuated by controller 2430. In the example illustrated, the pulsing yellow light emitting state 2510, indicating inoperability of treadmill 2420 has a highest priority. The yellow solid light emitting state 2514, indicating continued operation of treadmill 2420, but recommending inspection following an automatically corrected for error, has a second highest priority. The pulsing blue light emitting state 2532, which occurs when there is sufficient belt wear such that replacement of the belt is recommended, has the third highest priority amongst the four states. Lastly, the solid blue color light emitting state 2504, indicating that no service conditions exist or no errors exist, has the lowest priority.

Example: The console detects that the belt is worn out and turns the LED to blue pulsing. The console then detects a high line current error (ER36) and turns the LED to yellow pulsing. After the ER36 is cleared, the LED reverts to blue pulsing. If the power to the treadmill is then cycled, the LED would revert to blue solid but due to the wear state, it would go to blue pulsing. After service was performed to the treadmill deck and belt, the servicer would reset the belt wear status flag in a service menu, which would revert the LED from blue pulsing to blue solid.

As indicated by arrows 2526, 2528 and 2534, the status light provided by notifier 2440 can also include a step, process or procedure for clearing a light status indication. In one implementation, the service LED or notifier 2440 can be cleared independently via a service menu entry or by clearing the error log or by cycling power. This allows a servicer to clear out the external LED while still retaining the information in the error log.

In some implementations, if the error log is cleared, there may no longer be any information to tell a servicer what error caused the external light to change. In one implementation, the external light can be cleared upon erasing the log. In another implementation, the contents of the log will be retained in memory for later retrieval. In another implementation, the cycling of power to the status light can be used to clear out service conditions.

In another implementation, a status light can be used to monitor a motor controller. In one implementation, a motor controller LED can be used. The motor controller LED can be cleared independently via a service menu entry or by clearing the error log. This allows the servicer to clear out the motor controller LED while still retaining the information in the error log. Retaining the error log is desirable because if the error log is cleared, there is no longer any information to tell a servicer what error caused the motor controller LED to change, therefore the motor controller LED will clear upon erasing the log. Power cycling will not clear the motor controller LED.

Although FIG. 8 illustrates actuation of notifier 2440 between solid blue, pulsing blue, solid yellow and pulsing yellow states based upon a combination of belt wear and/or lift error, in other implementations, controller 2430 actuates notifier 2440 to other states. For example, in another implementation, controller 2430 alternatively actuates notifier

2440 to a green state to indicate all systems are operational and okay, a green blinking state indicating a time for routine maintenance based upon a certain number of elapsed hours or miles, a yellow state to warn of belt wear a blinking yellow state to indicate the existence of a prior error from which treadmill 2420 automatically self-recovered such that operation may be continued, but wherein inspection is recommended and a red state to indicate a severe error for which operation of treadmill 2420 should be discontinued until repair or maintenance.

The table below illustrates the various error identification members and the corresponding states of notifier 2440 before and after recovery. In some instances, recovery is automatic which leads to notifier 2440 being actuated by state 2514. In other states, recovery results in controller 2430 actuating notifier 2440 to the default solid blue light emitting state 2504.

the electrical current or amperage value was obtained. In one implementation, the electric current value or values of the sample are based upon signals received from sensor 2228 (shown in FIG. 5). In other implementations, other current sensors can be used. The speed of belt 2424 is provided by belt motor 2226, is known to controller 2430 based upon the current exercise program or user selection being carried out, is determined by controller 2430 or is sensed by a speed sensor. The incline is determined based upon signals received from position sensor 2428, is determined from other sensed parameters or is known to controller 2430 based upon the current exercise program or user selection being carried out.

As indicated by icon 2608, in one implementation, the samples of input current to treadmill 2220 are not continuous, but are taken at spaced apart intervals. In one implementation, controller 2430 receives, polls or otherwise

| Error # (Stop7, N = No, S = Soft, H = Hard) | Service LED, Blue Solid (Initital state) | Service LED, Blue pulsing (Initital State) | Service LED, Yellow solid (Initital State) | Service LED, Yellow pulsing (Initital State) | Service LED, Blue Solid (after recovery) | Service LED, Blue pulsing (after recovery) | Service LED, Yellow solid (after recovery) | Service LED, Yellow pulsing (after recovery) |
|---|---|---|---|---|---|---|---|---|
| 10(S) | | | X | | | | X | |
| 11(S) | | | X | | | | X | |
| 12(H) | | | X | | | | X | |
| 14(S) | | | X | | | | X | |
| 15(H) | | | X | | | | X | |
| 16(H) | | | X | | | | X | |
| 19(H) | | | X | | | | X | |
| 18(S) | | | X | | | | X | |
| 17(S) | | | X | | | | X | |
| 85(N) | | | X | | | | X | |
| 20(N) paused | | | X | | | | X | |
| 25(S) at power up | | | X | | | | X | |
| 27(S) | | | X | | | | X | |
| 28(S) | | | X | | | | X | |
| 88(S) | | | X | | | | X | |
| 35(H) | | | X | | | | X | |
| 36(S) | | | X | | | | X | |
| 30(S) | | | X | | | | X | |
| 32(S) | | | X | | | | X | |
| 37(S) | | | X | | | | X | |
| 46(N) | | X | | | | | X | |
| 42(N) | | X | | | | | X | |
| 44(N) | X | | | | X | | | |
| 45(N) | | X | | | | | X | |
| 86(S) | X | | | | X | | | |
| 87(S) | | | | X | | | X | |
| 80(N) | | X | | | | | X | |
| 81(N) | | X | | | | | X | |
| 82(N) | | | X | | | | | X |
| 83(N) | | | X | | | | | X |

FIGS. 10-13 illustrate one example method 2600 by which controller 2430 determines the level of belt wear, which may, in the absence of other errors, result in notifier 2440 being actuated to the pulsing blue light emitting state 2532. As indicated by block 2604, at the start of a workout or an exercise session of a person on treadmill 2420, controller begins collecting samples 2606. Each sample 2606 comprises multiple pieces of associated data 2610, parameters occurring at a particular moment in time or across a particular window or range of time. In the example illustrated, each sample 2606 comprises the electrical current or amperage being drawn by treadmill 2220 as well as the speed (MPH) and inclination of belt 2424 at the time that obtains samples every 30 seconds. In other implementations, controller 2430 alternatively obtains input current samples at other time intervals or continuously.

In one implementation, each sample of electric current draw comprises multiple amperage signals from sensor 2228 reflecting electrical current being drawn by treadmill 2220 over a predetermined period of time, wherein processor 2232 (or another processor) determines an average of electric current being drawn by treadmill 2220 for the period of time. In one implementation, each sample spans a period of time that is at least equal to the time for a complete footfall by a person running on belt 2224. In one implementation, each sample of electric current draw comprises an average of electric current being drawn by treadmill 2220 for a period of time spanning at least two complete footfalls. By the period of time of the sample spanning at least one complete footfalls, the impact of variations in electric current draw which occur depending upon the stage of footfall, are accommodated. By the period of time of the sample spanning at least two complete footfalls, the impact of a sample cutting off the beginning or ending of a footfall is reduced. In one implementation each electric sample comprise an average of electric current for a period of time of at least 2 seconds and nominally at least 2.5 seconds for up to 30 seconds.

In implementations where each sample comprises an average of multiple current or amperage values during a predefined window of time, the average is associated with an average of the corresponding different speeds of belt 2424 during the same window of time as well as an average of the corresponding different inclines of belt 2424 during the same window of time. In yet other implementations, controller 2430 rejects current or amperage samples taken from windows of time during which the speed of treadmill belt 2424 varied or during which the incline of belt 2424 varied. In some implementations, controller 2430 rejects current or amperage samples taken from windows of time during which treadmill belt 2424 is at any incline or has an inclined value other than zero.

In one implementation, instructions stored in memory 2234 further direct processor 2232 to apply one or more signals or sample acceptance or input conditions as indicated by block 2614. Such sample input conditions either prevent or inhibit the retrieval of electric current signals from sensor 2228 or result in such selected signals being discarded or not used as part of the overall criteria for determining the level of belt wear or whether the current belt is in need of replacement. In some implementations, electrical current signals received when belt motor 2226 is driving belt 2224 at selected speeds are not accepted or are not utilized as part of the determination of belt wear. For example, in one implementation, as indicated by decision point 2616, electric current signals received from sensor 2228 while belt 2224 is being driven at a speed of less than 6.5 mph are not accepted or are not utilized. Electric current signals received from sensor 2228 while belt 2224 is being driven as speed of greater than 12.5 mph are not accepted or are not utilized.

As indicated by decision point 2618, electric current signal received from sensor 2228 while belt 2224 is inclined, at an inclination setting of greater than or less than zero, are not accepted or are not utilized. In some implementations, the electric current signals received from sensor 2228 while belt 2224 is inclined (at an inclination of greater than zero) are utilized as part of the determination of the current level of belt wear, wherein in the values of such signals received during an inclined state of belt 2224 are weighted based upon the inclination.

In one implementation as indicated by decision point 2620, electric current signals received when a person is not walking, running or jogging upon belt 2224 are not accepted or are not used. For example, when a person is standing on the sides of side rails 2448 about belt 2224, such that no footfalls are detected, the electric current signals received from sensor 2228 are not utilized as part of the determination of belt wear. In other implementations, one or more such signal acceptance conditions are not applied.

As indicated by block 2624, those amperage or current samples (whether they be momentary values or averages over a window of time for the electric current drawn by treadmill 2220) that satisfy input conditions or criteria of block 2614 are assigned to different speed ranges or speed windows based upon the particular speed of belt 2424 at which the amperage sample was taken (or average speed during the window of time from which the average amperage value was determined). In the example illustrated, controller 2430 deposits each sample value in one of six different speed windows: 6.5-7.5 mph; 7.5-8.5 mph; 8.5-9.5 mph; 9.5-10.5 mph; 10.5-11.5 mph; and 11.5-12.5 mph. In other implementations, the total range of speeds for which sample input currents are accepted may be different, for example, having a different lower end other than 6.5 or a different upper end other than 12.5. In other implementations, the total range of speeds may be partitioned differently into other speed ranges or windows.

As indicated by block 2626, controller 2430 counts the number of input current sample values stored in each window during the workout. As indicated by block 2628, 2630 and 2632, upon completion of the work out, controller 2430 calculates or determines the average current for each speed range or window and stores the determined average for each speed window for the individual workout. This routine is utilized for each workout on the particular treadmill 2420. In the example illustrated, completion of a workout results in the determined sample current values for each speed range or window of the workout being forwarded to routines 2640 and 2642 shown in FIG. 10 to update the ongoing or current belt wear status for treadmill 2420.

Figure 10:
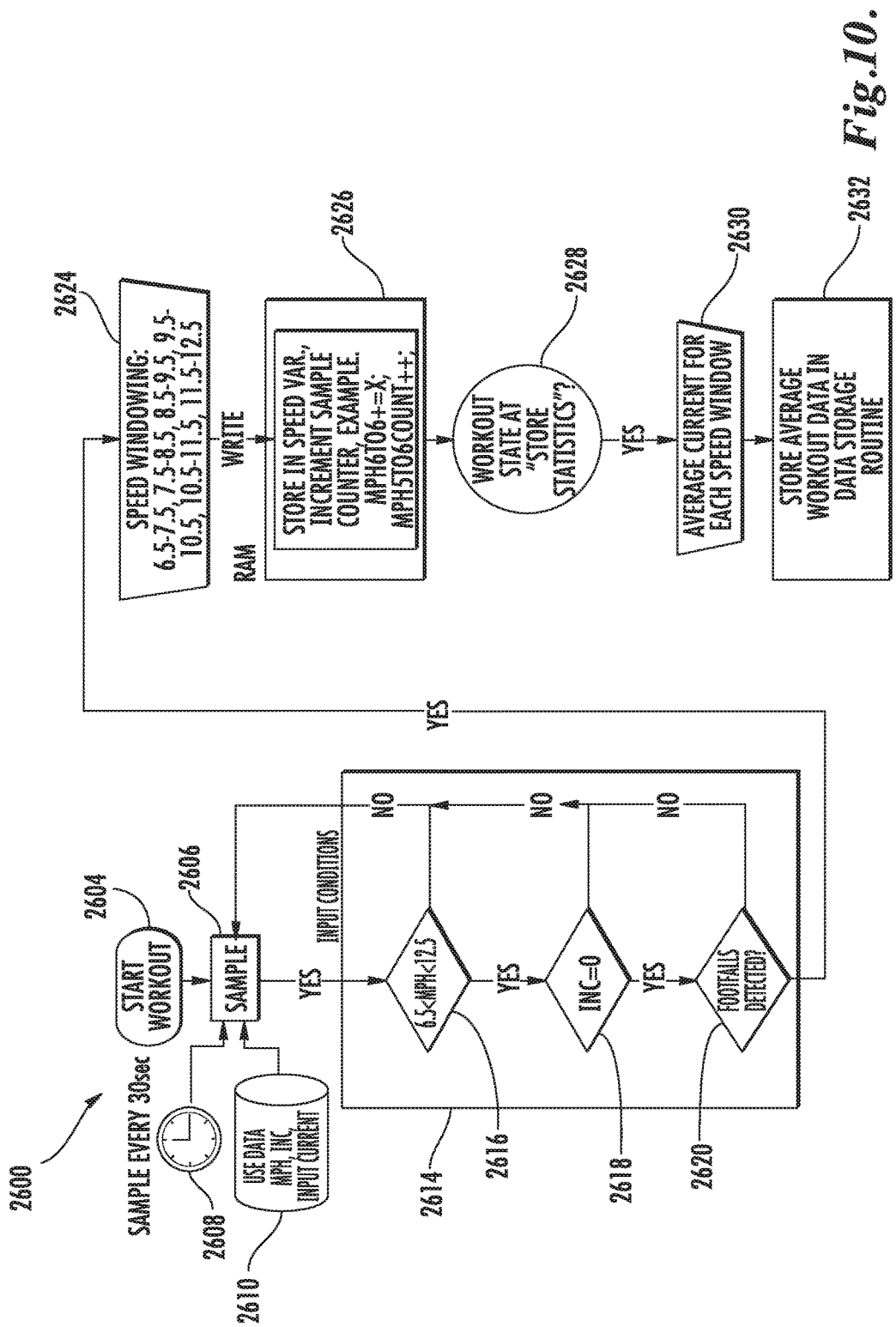
FIG. 10 is a flow diagram of an example belt wear identification method that may be carried out by the treadmill of FIG. 5.

As shown by FIG. 10, the data stored in block 2332 is used by average current routine 2640 and peak current routine 2642. In carrying out the average current routine 2640, controller 2430 estimates a belt life percentage value for each speed range or window of the newly received workout. In the example illustrated, controller 2430 utilizes a predetermined and stored electric current draw value 2642 for a new belt (100% of its expected life remaining) for treadmill 2420 or for another treadmill having characteristics similar to that of treadmill 2420 being driven at the median speed of the particular speed range window. Controller 2430 further utilizes a predetermined and stored electric current draw value 2644 for an old or used belt in need of replacement (0% of its expected life remaining) for treadmill 2420 or for another treadmill having characteristics similar to that of treadmill 2420 being driven at the median speed of the particular speed range window. Value 2642 represents what the current draw value is expected to be for treadmill 2420 with a brand-new belt when driven at the median value for the particular speed range. Value 2644 represents what the current draw value is expected to be for treadmill 2420 with a used belt that is in need of replacement when driven at the median value for the particular speed range.

In another implementation, controller 2430 determines the actual average speed of treadmill belt 2424 for the actual current samples for the particular speed window in the newly received workout. In such an implementation, values 2642 and 2644 represent what the current draw value is expected to be for treadmill 2420 with a new belt and a used belt in need of replacement, respectively, when treadmill 2420 is driven at the determined actual average speed. In one implementation, values 2642 and 2644, either for speed range median values, or determined actual average speeds, are empirically obtained and stored. In yet other implementations, values 2642 and 2644 may correspond to expected current draw values for treadmill 2420 (or a similar treadmill) with a new and used belt, respectively, when driven at other values associated with the particular speed range, such as the lower limit or upper limit of the speed range.

As indicated by block 2646, for each speed range or window of the newly received workout, controller 2430 interpolates a percent of belt life estimate using values 2642 and 2644 for each speed range. Controller 2430 determines a belt life percentage estimate 2648 for each speed range based upon the average current value for the speed range and its relationship to values 2642 and 2644. In one implementation, controller 2430 applies a linear interpolation to determine the percent of belt life estimate for the particular speed range for the incoming workout. In other implementations, controller 2430 applies other interpolations or formulas to determine the belt life estimate for the particular speed range using values 2642 and 2644. In yet other implementations, the belt life percentage for each speed window is determined based upon a formula in which the amperage value is at least one of the inputs or variables in the formula.

As indicated by block 2650, controller 2430 writes and stores the determined belt life estimate for each speed window for the incoming workout. In one implementation, the belt life percentage data is written to EEPROM memory. In the example illustrated, controller 2430 stores an array of workouts, each of the array workouts comprising the speed ranges and belt life estimate associated with each speed range. For example, the array of workouts may include a belt life estimate for each of the speed ranges for a first workout, a belt life estimate for each of the speed ranges for a second workout and so on.

As illustrated by block 2652, in the example illustrated, controller 2430 stores and maintains a predefined number of workouts in the array. In the example illustrated, for each new workout being added to the array by controller 2430, controller 2430 removes the oldest workout and its associated belt life estimates in the respective speed ranges. In other words, controller 2430 maintains the array of workouts employing a first in, first out (FIFO) method. In one implementation, controller 2430 maintains an array of 100 workouts. In other implementations, controller 2430 maintains an array having a different total number of workouts.

Figure 11:
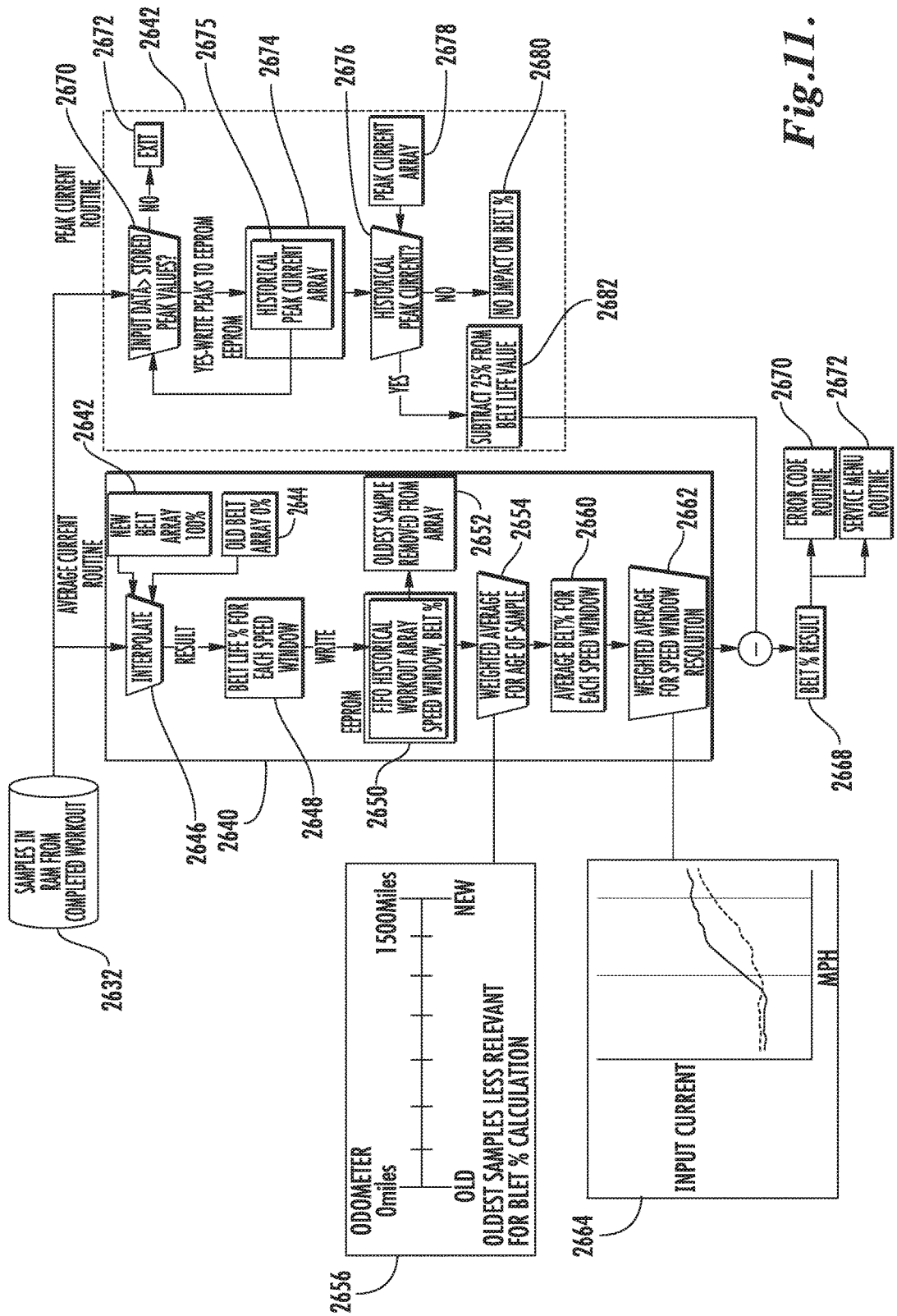
FIG. 11 is a flow diagram of an example belt wear identification method that may carried out by the treadmill of FIG. 5.

As indicated by block 2654, controller 2654 applies a workout age-based weighting factor to each of the workouts in the array of workouts. In one implementation, the oldest workouts are given the least weight (multiplied by the smallest weighting factor) while the newest workouts recently added to the array are given the greatest weight (multiplied by the largest weighting factor). As illustrated by block 2656 (an enlarged view of which is shown in FIG. 11), in one implementation, the age-based weighting factors are based upon the number of miles of use that treadmill belt 2424 had at the time of the associated workout. In one implementation, those workouts occurring within the last 1000 miles of use of treadmill belt 2424 are given the greatest weight, 100% in one implementation. In such an implementation, those workouts occurring earlier in time, prior to last 1000 miles of use of treadmill belt 2424 are given a smaller weight, 50% in one implementation. In one implementation, those workouts occurring earlier in time, prior to the last 1500 miles of use of treadmill belt 2424 are weighted at 10% or less or are given no weight. In other implementations, the weighting factors may be applied differently to each of the different workouts using linear curve regression or other formulas. In yet other implementations, in lieu of weighting based upon age determined from the number of miles, the weighting is based upon age determined from other age-reflecting criteria such as the number of hours of use of the particular belt 2424, the number of calories consumed through the use of belt 2424, the total amount of electrical power consumed by the driving of belt 2424 or the like, wherein more recent workouts are giving a greater weight as compared to older workouts.

As indicated by block 2660, controller 2430 averages the belt life estimate for each speed range or window across the current weighted array of workouts. For example, for an array of n workouts, for each speed range or window, controller 2430 sums the weighted (per block 2654) belt life percentage from each of the n workouts and divides that total by the number n.

Figure 12:
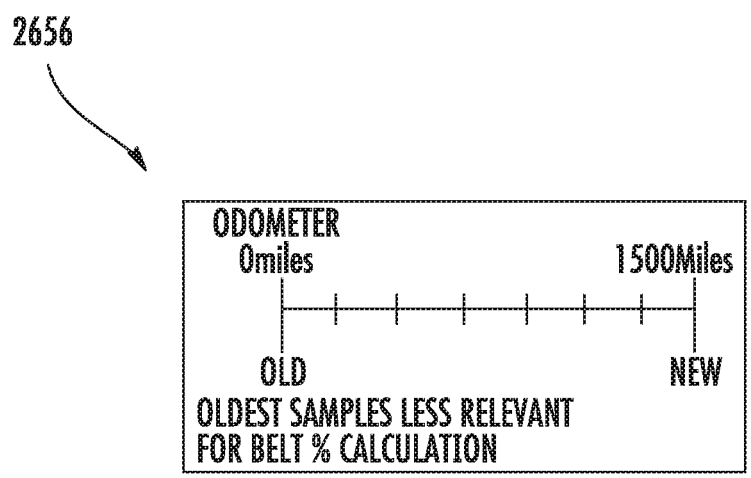
FIG. 12 is a diagram illustrating age-based weighting of workout samples.

As indicated by block 2662, averages the belt life percentages across all of the different speed ranges or windows to determine a single remaining belt life estimate. As further indicated by block 2662, prior to such averaging, controller 2430 applies an additional resolution weight to each of the average belt life estimates (per block 2660) for each of the different speed ranges or windows. As indicated by block 2664 (enlarged view of which is shown in FIG. 12), electric current draw at certain speeds of treadmill belt 2224 are more indicative of belt wear or more accurately reflect belt wear as compared to electric current draw at other speeds of treadmill belt 2224. For example, at certain low speeds and at certain high speed ranges, the difference or resolution between the current draw by treadmill 2220 when driving a new belt as compared to when driving an old belt in need of replacement is relatively small. However, at certain speeds or speed ranges, the difference or resolution between the electric current draw (input current) of treadmill 2220 when driving a new belt versus when driving an old belt in need of replacement is relatively large. In recognition of this difference in resolution, controller 2430 applies greater weighting factors to those speed ranges which offer greater resolution or a greater difference between the current draw of treadmill 2220 when driving a new belt as compared to when driving an old belt in need of replacement. Because controller 2230 differently weighs the belt life percentages of the different speed ranges or windows, and then determines an overall average of the belt life estimate 2668 across the speed ranges based upon the weighted individual speed range belt life estimates, more accurate and reliable identification of belt wear is achieved.

In one implementation, controller 2430 additionally applies an occurrence weighting factor to each of the different speed ranges prior to determining the overall average of belt life estimates from the different speed ranges. In one implementation, controller 2430 applies a larger occurrence weighting factor to those speed ranges having a fewer number of workout values and a smaller occurrence weighting factor to those speed ranges having a greater number of workout values. For example, many workouts on treadmill 2420 may not result in any electric current values or any corresponding belt life estimates for higher speed ranges (the person exercising doing the workout does not run that fast). Controller 2430 accounts for this by providing such belt life estimates for the higher speed ranges with a larger occurrence weighting factor as compared to speed ranges that are more "common" and more likely to have a greater number of data points. In yet other implementations, controller 2430 may omit the application of such occurrence weighting or may alternatively provide an occurrence weighting that is just the opposite, wherein belt life estimates for speed ranges having a greater number of workout data points are given a greater weighting.

As indicated by blocks 2670 and 2672, controller 2430 utilizes the determined overall average of belt life estimates, value 2668, as part of method 2500. Controller 2430 compares the determined overall average of belt life estimates in thresholds as a basis for controlling and actuating notifier 2440. As indicated by block 2670, in the example illustrated, if the overall average of belt life estimates, value 2668, is less than 10% of the total expected belt life, controller 2430 actuates notifier 2440 to state 2532. Alternatively, if the overall average about life estimates, value 2668, is greater than 25% of the total expected belt life, controller 2430 actuate notifier 2440 to the default state 2504.

Although the above description of the average current routine 2640 outlines a predefined order of steps, in other implementations, variations in the order and the timing of the application of weighting factors may vary. For example, instead of the different weighting factors as applied in blocks 2654 and 2662 being applied to already determined belt life estimates for the different speed ranges, in other implementations, the different weighting factors are applied directly to the electrical current draw/amperage values prior to the determination of a belt life estimate from such amperage values through interpolation as discussed above with respect to block 2646. In other words, blocks 2646-2650 may alternatively be carried out after block 2654 or after completion of block 2662, wherein the weighting factors are applied to actual current values rather than belt life estimates. In some implementations, block 2652 (the removal of the oldest work out through FIFO) may be omitted, wherein the oldest workouts are effectively diminished in importance through the weighting applied in block 2654. In other implementations, age-based weighting of block 2654 is omitted.

In one implementation, controller 2430 additionally applies the optional peak current routine 2642. As indicated by block 2670, controller 2430 compares the electric current or amperage values for each of the speed ranges or window of the workout being added to the maximum recorded input current values for each corresponding speed range or window for prior workouts. In one implementation, controller 2430 compares the electric current or amperage values for each of the speed ranges or windows of the workout being added to the maximum recorded input current values far all previous workouts. As indicated by block 2672, if none of the amperage values for each of the speed ranges or windows of the workout being added exceed the corresponding maximum input current value from prior workouts, controller 2430 exits the peak current routine 2642.

As indicated by block 2674, if at least one of the speed windows of the workout being added has an associated amperage value that is greater than the historical peak amperage value for the corresponding speed window, the amperage value or values for those speed windows that exceed the historical peak amperage values for the corresponding speed windows are stored in place of the old prior peak current or amperage values for the associated speed ranges. In other words, controller 2430 maintains an up-to-date record of the peak amperage values experienced by treadmill 2420 during use of the particular belt 2424 in each speed window are range.

As indicated by block 2676, once the peak current record for each speed window has been updated with the newly added amperage values for the workout (should they exceed the prior recorded peak amperage values), controller 2430 compares each up-to-date peak amperage or peak current value for each speed range to a corresponding amperage threshold for the same speed range. The example illustrated, controller 2430 consults a peak current array 2678 in which is stored predetermined threshold peak amperage values for each speed window. For each recorded up-to-date peak amperage value for a particular speed window stored in memory 2675, controller 2430 will consult array 2678 to determine if the threshold for the particular speed range has been exceeded. As indicated by block 2680, no action is taken if none of the current recorded peak current or amperage values in any of the speed windows exceed the peak amperage thresholds for the corresponding speed windows. Alternatively, as indicated by block 2682, if controller 2430 determines that an up-to-date peak amperage value for a least one of the speed Windows exceeds the peak amperage or current threshold for a corresponding speed window, controller 2437 tracks a predetermined amount or percentage from the overall belt life percentage determined in block 2662 prior to application of error code routine 2670 or service menu routine 2672. In the example illustrated, controller 2430 subtract 25% from the belt life value determined in block 2662. In other implementations, other percentages may be subtracted.

In still other implementations, other criteria may be applied for determining whether or not to subtract a percentage of the belt life value in block 2682. For example, in some implementations, to subtract an additional percentage from the belt life value in block 2682, routine 2642 may require that the pink current threshold value be exceeded by a predetermined amount or a predetermined percentage to trigger the subtraction in block 2682. In another implementation, routine 2642 may alternatively omit block 2674, wherein the amperage values for each newly added work out are directly compared to the peak amperage or current threshold of blocks 2678 to determine whether or not to subtract a percentage from the belt life value per block 2682. In one such implementation, routine 2642 may require that a consecutive predetermined number of workouts have amperage values for a speed range that exceed the peak current threshold value for the corresponding speed range before subtracting from the belt life value per block 2682. By additionally considering peak current values using routine 2642, the more reliable rating or estimate regarding the containing belt life is achieved. In some implementations, routine 2642 is omitted.

Overall, treadmill 2420 outputs a notification regarding the estimated wear of belt based on sensed electric current or amperage values. Treadmill 2420 automatically takes into account various factors that impact the amount of instantaneous input current being drawn by the treadmill such as: B:
  Dynamic friction at belt-deck interface;
  Belt break in;
  Speed setting of treadmill;
  Runner variation including weight, height, running style, footwear;
  Phase of footfall (heel striking deck, foot pushing off, feet not contacting deck);
  Presence or absence of a runner;
  Incline setting of treadmill (high incline settings reduce the amount of current consumed);
  Line voltage variation; and
  Variation in footplant location on the deck.
  Dynamic Friction at Belt-Deck Interface
  Controller 2430, through the above routines, isolates this friction which indicates belt wear.
  Belt Break In
  A new belt and deck can draw higher current for the first 200-500 miles. This action could result in false indication of a worn belt. Controller 2430 utilizes averaging across workouts to prevent false trips. Calculated belt life status now may appear to be reduced then recover in during the break in period. This action could help catch future manufacturing issues with belt/deck/motor that grossly impact unit efficiency.

Speed Setting of Treadmill

An old belt and new belt draw the same amount of current at lower speeds, so belt life cannot be resolved. In the example illustrated, controller 2430 captures data that is in the speed range that provides the biggest difference between good belt and bad belt curves.

Controller 2430 further applies weighting factors to those speed values that are used to take into account the belt wear indicating resolution of each particular speed range. Capturing data for each speed would result in a cumbersome routine because speed can be set in 1/10th MPH. Controller 2430 throws speeds in a given window into the same array. Example: Data points captured at 6.1, 6.5 and 6.9 MPH would all go into the 5-6 MPH window array. Controller 2430 stores all samples that fall within a speed window together. Each speed window has unique input current thresholds, which counteracts the variation due to speed setting.

Runner Variation Including Weight, Height, Running Style, Footwear

Because controller 2430 stores multiple workouts and averages samples that fall within a given speed window together, controller 2430 reduces the impact of outlier runners that might throw off the results. If the treadmill is deployed in a club where the majority of runners are heavy and fast (outliers), the input currents will be higher, on average. In this case, controller 2430 will therefore recommend that the club service the belt and deck more often. This is the desired result as the goal of the routine is to maintain lower input currents.

Phase of Footfall (Heel Striking Deck, Foot Pushing Off, Feet Not Contacting Deck)

The phase of a runner's footfall affects the instantaneous current draw of the treadmill. A typical runner will keep a stride rate around 1-2 Hz or a period of 500 ms-1 second. Controller 2430 receives the samples of input current as a rms average calculated over 2.5 seconds which counteracts the variations in current over a footfall.

Presence or Absence of a Runner

Controller 2430 uses variations in torque on the motor to detect whether a runner is present on the belt. If no user is detected, samples are not taken.

Incline Setting of Treadmill (High Incline Settings Reduce the Amount of Current Consumed)

In the example illustrated, samples of input current are only taken if the incline setting is at 0.

Line Voltage Variation

Daily variations in line voltage are counteracted by the long term averaging over the course of multiple workouts, such as 100 workouts. If the club is in a location where the line voltage is chronically low or where the impedance of the wall circuit is high, all currents drawn from the wall will be elevated. This will result in controller 2430 recommending more frequent belt replacement.

Variation in Footplant Location on the Deck

The treadmill belt and deck can wear unevenly front-back and left-right. The locations of footfalls on the deck can, therefore, affect the amount of current drawn by the treadmill. The long term, multiple workout average accommodates and reduces the impact of this variation.

Although treadmill 2420 is described and illustrated as utilizing notifier 2440 (shown in FIG. 7), in other implementations, treadmill 2420 alternatively employees a separate or different notifier that indicates belt wear independent of other service conditions that may exist. For example, in other implementations, notifier 2440 of treadmill 2420 may alternatively indicate service conditions other than belt wear, such as in method 2500 but where state 2532 omitted. In such an implementation, treadmill 2420 comprises a separate notifier dedicated to indicating belt wear. For example, in one implementation, treadmill 2420 alternatively comprises another light or an audible device that indicates belt wear as determined from method 2600 (or method 2300). In yet another implementation, treadmill 2420 may indicate such belt wear on one or more presented screens of display 2430 or through the use of lights or other indicators on console 2429. In one implementation, the belt wear determined by method 2600 or method 2300 is communicated by treadmill 2420 in a wired or wireless fashion to a remote computing and display device.

Although treadmill 2420 is illustrated as incorporating controller 2430 which receives the electric current signals from sensor 2428 and which determines belt wear pursuant to method 2600 or method 2300, in other implementations, method 2300 or method 2600 is alternatively carried out at a location remote from treadmill 2420. For example, in one implementation, one or more of the processes or routines carried out by controller 2430 is alternatively carried out at a remote computing location with respect to treadmill 2420. In one implementation, the electric current being drawn by treadmill 2420 from the mains power input (are being drawn by the belt motor 2226 by treadmill 2420) is sensed and transmitted to or received by a controller, such as controller 2430, across a wired or wireless network. In such an implementation, method 2600 (method 2300) is carried out by the remote computing device, such as a remote computing device at a central computing location within a health club or fitness facility, wherein the remote computing device carries out method 2600 or method 2300 for multiple treadmills at the health club, fitness facility or business associated fitness facility. In yet another implementation, the remote computing device is located at a remote location which carries out method 2600 or method 2300 for multiple treadmills at multiple different geographically located fitness facilities, health clubs, business or company associated fitness facilities or consumer residences. In one implementation, the monitoring of belt wear may be provided in carried out by a computing device or controller of the manufacture of such treadmills. In each of the above implementations where the analytical steps or processes of method 2300 or method 26 are carried out by a computing device remote from the treadmill, the computing device remote from the treadmill transmit signals to the treadmill, either indicating level of belt wear or controlling the indication of belt wear by a notifier on the treadmill.

Figure 14:
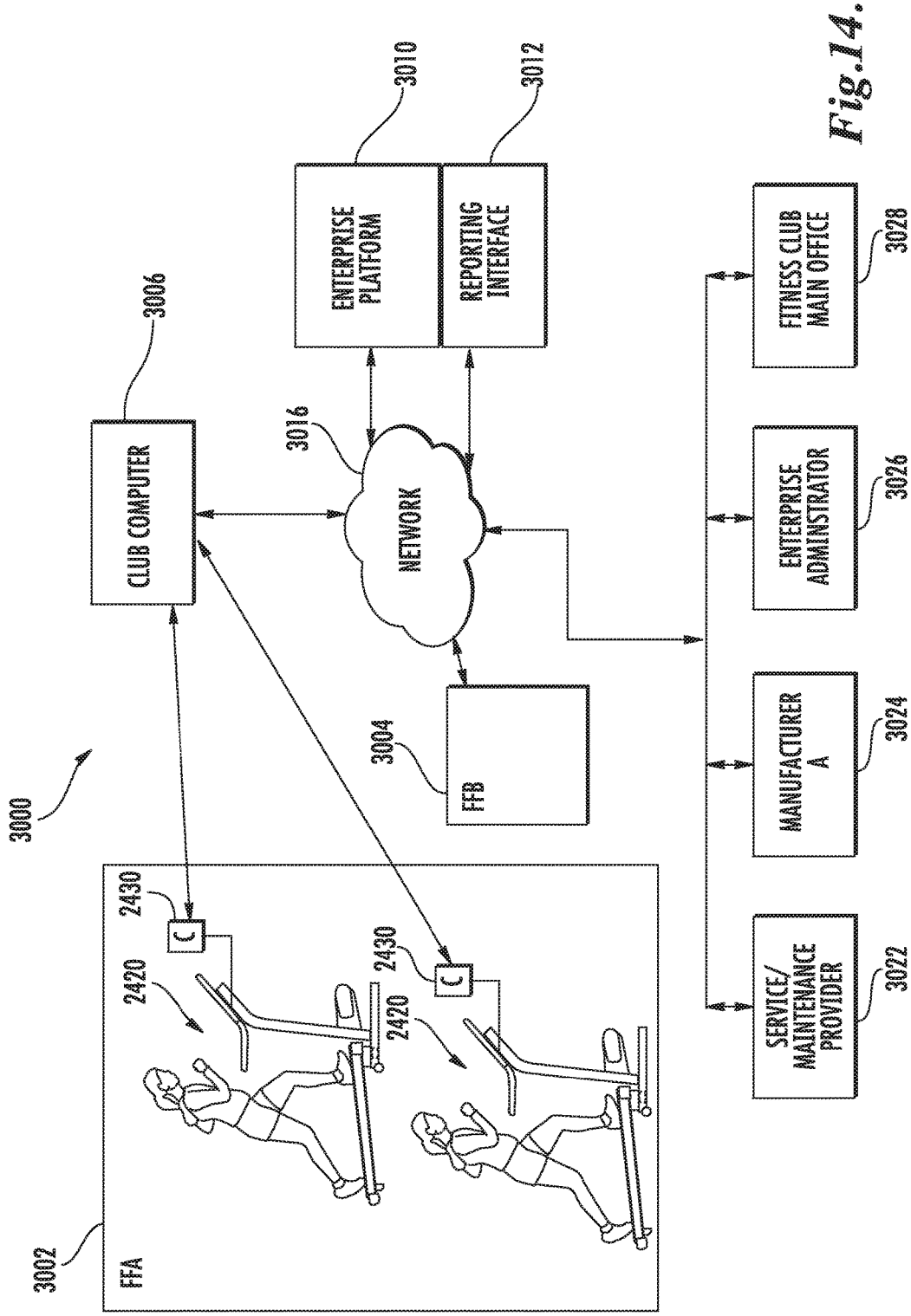
FIG. 14 is a schematic illustration of an example information tracking system, a service tracking system, a service alert messaging service, and a reporting interface.

FIG. 14 schematically illustrates an example treadmill servicing system 3000. System 3000 accommodates the servicing of treadmills either on a club basis or an enterprise basis. As shown by FIG. 14, a fitness facility, such as fitness facility 3002, comprises multiple treadmills 2420, each treadmill 2420 comprising controller 2430 described above. In the example, each of treadmills 2420 communicate with a club computer or fitness facility computer 3006 across a wired or wireless network. Club computer 3006 stores service information for each of treadmills 2420, including the determined remaining belt life (determined per block 2668 described above) or other indicator of belt wear and the associated date and time of such determined remaining belt life or belt wear. Such information stored at club computer 3006 is accessible for viewing by the club manager, fitness facility manager or other personnel. As a result, system 3000 facilitates consolidated belt wear and belt replacement management across all of the treadmills 2420 of the fitness facility 3002.

As further illustrated by FIG. 14, in one implementation, club or fitness facility computer 3006 may further transmit such servicing information and such belt wear information to an enterprise platform 3010 and/or a reporting interface 3012 across a wired or wireless network 3016. In other implementations, controllers 2430 of treadmills 2420 directly communicate service information and belt wear information across network 3016 to enterprise platform 3010 and reporting interface 3012.

Enterprise platform 3010 manages treadmills 2420 at multiple fitness facilities, including fitness facility 3002 as well as fitness facility 3004. In one implementation, enterprise platform 3010 comprises a corporate office which manages multiple separate geographically distinct fitness facilities. In one implementation, enterprise platform 3010 comprises an enterprise specializing in servicing and maintaining fitness equipment units, such a treadmills 2420. In yet another implementation, enterprise platform 3010 comprises a manufacturer, wholesaler or retailer of treadmills 2420. Fitness facility 3004 includes multiple treadmills 2420, wherein servicing information and belt wear information from treadmills 2420 is communicated across network 3016 to enterprise platform 3010 as well as reporting interface 3012. Platform 2010 stores the received service information and received belt wear data. Reporting interface 3012, associated with platform 3010, provides access to the data such as through the use of webpages, emails or other notification mechanisms.

Enterprise platform 3010 and reporting interface 3012 transmit treadmill service information/service conditions and/or belt wear data to various entities across network 3016, such as service maintenance provider 3022, manufacturer 3024, enterprise administrator 3026 and/or fitness club main office or manager 3028. In one implementation, signals from enterprise platform 3010 transmitted to service/maintenance provider 3022 indicate those treadmills 2420 at managed fitness facilities that are in need of replacement or that are approaching replacement. In one implementation, the treadmill wear information comprises a determined rate at which the remaining life of a particular treadmill belt of a particular treadmill is declining. For example, the computing device, such as controller 2430 or a remote computing device determines the rate of treadmill belt wear by performing statistical analysis and comparing the different remaining belt life percentages for a particular treadmill 2420 determined at different times over time. In such an implementation, controller 2430, club computer 3006, enterprise platform 3010 or another computing device not only determines the rate at which remaining life of treadmill belt of a particular treadmill 2420 is declining, but also determines or estimates the date at which the treadmill belt will require replacement. In such implementations, signals from enterprise platform 3010 (or from club computer 3006 for an individual fitness facility) automatically trigger a computing device associated with service/maintenance provider 3022 to automatically schedule maintenance of the particular treadmill, such as to automatically schedule treadmill belt replacement appointment for the particular treadmill. In one implementation where an inventory of the appropriate treadmill belt may not necessarily be maintained by the service/maintenance provider, such signals may also automatically trigger, prior to the scheduled date of belt replacement, the ordering of the appropriate treadmill belt such as the service/maintenance provider 3022 receives the necessary treadmill belt at or prior to the scheduled date of belt replacement appointment for the particular treadmill, taking into account predetermined or stored shipping or transportation times for the replacement belt. In such an implementation, enterprise platform 3010 additionally automatically transmits the scheduled belt replacement date and time to club computer 3006 for viewing by the fitness facility manager and/or to the fitness club main office 3028 across network 2016.

As further shown by FIG. 14, in one implementation, enterprise platform 3010, in conjunction with reporting interface 3012, transmits service condition information as well as belt wear data (such as the remaining expected life of a belt of a particular treadmill) to manufacture 3024. In some implementations, manufacturer 3024 manages treadmills 2420. Such data may assist manufacturer 3024 to evaluate design changes for treadmills 2420. In implementations, manufacturer 3024 may additionally use such information for addressing warranty issues.

Figure 13:
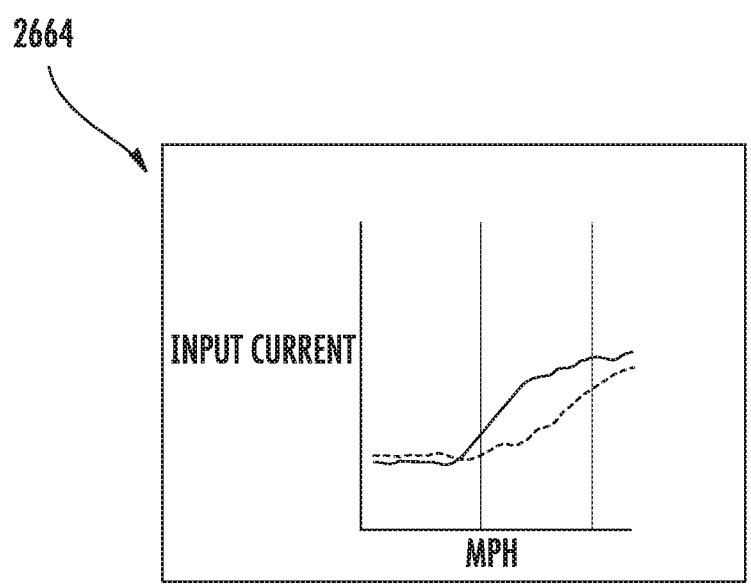
FIG. 13 is a diagram illustrating a basis for resolution-based weighting of workout samples.
Figure 15:
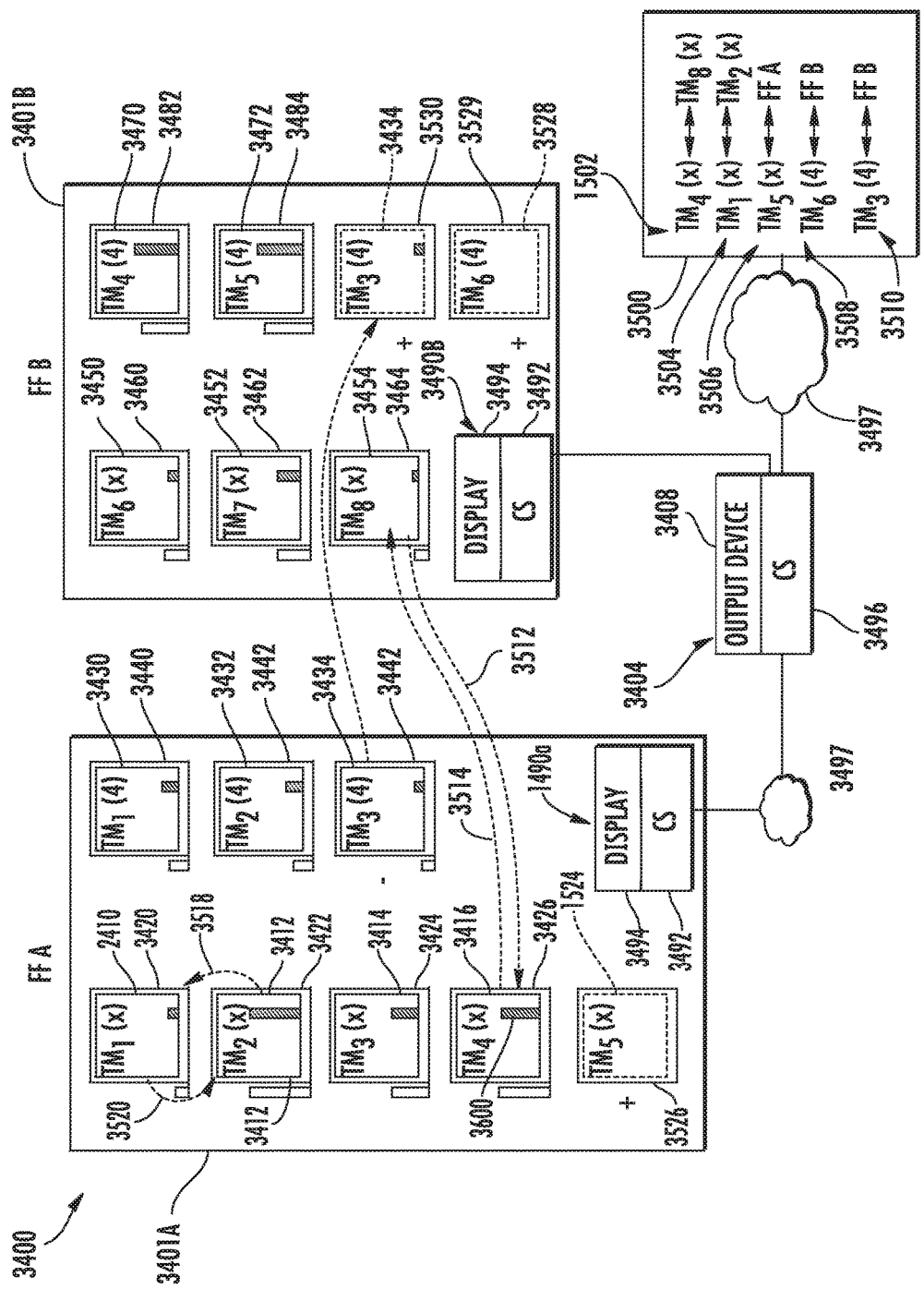
FIG. 15 schematically illustrates an example fitness equipment unit distribution management system.

FIG. 13 schematically illustrates an example treadmill distribution system 3400 which facilitates a better distribution of treadmills 2420. Treadmill distribution management system 3400 automatically collects belt wear/belt life data from treadmills and provides a report, display or other output of recommended or suggested changes to the current distribution of treadmills based upon the collected belt wear/belt life data. The suggested changes to the current distribution of treadmills may be such that the time at which a treadmill belt needs to be replaced is delayed. As shown by FIG. 15, system 3400 comprises fitness facilities 3401A (FFA) and 3401B (FFB) (collectively referred to as fitness facilities 3401) and central computing device 1404.

Fitness facilities 3401 comprise buildings, rooms or other locations that are remote from, or separate to, one another and that contain health and exercise equipment or treadmills. Fitness facilities 3401 may also include different areas or regions of a single larger facility. Fitness facilities 3401 may be owned, operated or managed by the same entity. The output provided by computing device 3404 facilitates management of the distribution of equipment or treadmills at facilities 3401 by the entity that owns, operates or manages both facilities 3401.

FIG. 15 schematically illustrates each of fitness facilities 3401 in solid lines prior to implementation of distribution changes as recommended by computing device 3404. Those changes recommended by computing device 3404 based upon collected belt wear/belt life data are illustrated in FIG. 15 in broken lines. As shown by FIG. 15, prior to implementation of any distribution changes, fitness facility 3401A includes treadmills 3410 (TM1(X)), 3412 (TM2(X)), 3414 (TM3(X)) and 3416 (TM4(X)) at locations 3420, 3422, 3424 and 3426, respectively. Fitness facility 3401A includes treadmills 3430 (TM1(Y)), 3432 (TM2(Y)) and 3434 (TM3(Y)), at locations 3440, 3442 and 3444, respectively. Prior to implementation of any distribution changes, fitness facility 3401B includes treadmills 3450 (TM6(X)), 3452 (TM7(X)) and 3454 (TM8(X)) at locations 3460, 3462 and 3464, respectively. Fitness facility 3401B includes treadmills 3470 (TM4(Y)) and 3472 (TM5(Y)) at locations 1480 and 1482, respectively.

In the example illustrated, a current cumulative usage state (reflecting the belt wear or remaining belt life) of each treadmill belt is schematically illustrated with a solid vertical bar, the higher or taller the solid bar, the higher or larger the extent of wear of the particular treadmill belt. Such belt wear or remaining belt life is determined utilizing method 2300 or method 2600 described above. In other implementations, the belt life is determined or measured using other metrics, for example, total hours of usage, total miles as reflected by an odometer, total number of separate exercise sessions by users, and/or combinations thereof. The depicted bars are for illustrative purposes only to indicate a state of the machines or treadmills. Any treadmills illustrated without any bars constitute treadmills having belts that are new or substantially new.

In the example illustrated, the rate of belt wear at each location is schematically illustrated with a hollow vertical bar. The wear trend or rate constitutes the extent or rate that a belt of a particular treadmill at a particular location is wearing during a predefined period of time. For example, if a first treadmill at a first location is used 80 hours for a month and a second treadmill at a second location is used 50 hours during the same month, the higher usage rate and corresponding higher belt wear of the first treadmill at the first location would be represented by a taller hollow bar as compared to the smaller hollow bar representing the belt wear rate at the second location. In some instances, the belt wear state of a treadmill belt may not correspond to the usage rate at a particular location. For example, an older machine having a high belt wear state may be located at a location having a low belt wear rate.

As further shown by FIG. 15, fitness facilities 3401A and 3401B include computing devices 3490A and 3490B, respectively. Computing devices 3490A and 3490B (collectively referred to as computing devices 3490) each comprise a controller or control server 3492 and a display 3494. Control server 3492 comprises one or more processing units in communication with each of treadmills in the associated fitness facility so as to be capable of automatically collecting belt wear/belt life data from each of the treadmills.

According to one embodiment, control server 3492 of fitness facility 3401A communicates with each of the treadmills of facility 3401A in a wired or wireless fashion. Likewise, control server 3492 of fitness facility 3401B communicates with each of treadmills of facility 3401B in a wired or wireless fashion. Following instructions or a computer readable program contained in an associated persistent storage device or memory (or an integrated circuit) associated with control server control server 3492 automatically collects belt wear/belt life data from each of the associative treadmills on a periodic basis. For example, control server 3492 may directly access and/or directly receive signals representing use of the associative treadmill. Control server 3482 may directly access or directly receive signals front an odometer (identify miles or distance usage) or clock (identifying time are hourly usage). In another embodiment, control server 3492 may collect or access such belt wear/belt life data from a memory or other storage device associated with the treadmill itself. Because such data collection is performed automatically on a periodic basis, no user or manager intervention is required. In other embodiments, the collection of data may be done in response to a command by a person or trigger event. Such belt wear/belt life data may additionally include a warranty expiration date for the treadmill.

The belt wear/belt life data collected may include both the usage/wear state of each treadmill belt, the belt wear rate at each of the locations at which the treadmills are located or installed, the number of separate usage sessions of each treadmill or combinations thereof. Such belt wear/belt life data may additionally include the date of installation of the current belt and warranty expiration date or dates for each treadmill belt. In one embodiment, the wear rate for a treadmill belt may be calculated based upon the wear state and the date of installation data for the treadmill belt.

Each display 3494 comprises a device configured to present output from server 3492 on a panel, screen or monitor. In some embodiments, display 3494 may be omitted. In yet other embodiments where computing device 3404 itself directly communicates with each of the treadmills at each of the fitness facilities 3400, computing devices 3490 may be omitted.

Computing device 3404 comprises a controller or control server 3496 and output device 3498. Control server 3496 comprises one or more processing units in communication with control service 3492 of each of a plurality of fitness facilities such as fitness facilities 3400. In one embodiment, control server 3496 is remote from fitness facilities 3400 and communicates with fitness facilities 3400 across the Internet 3497 or other computer network. In one embodiment, control server 1496 communicates in a wired or wireless fashion.

Control server 3496 is configured to operate according to operating instructions (software, code or computer readable program) contained in a memory or other persistent storage device (integrated circuit, flash memory) associated with control server 3496. In accordance with such instructions, control server 3496 automatically collects, gathers, retrieves or requests belt wear/belt life data regarding each of the treadmills at fitness facilities 3400. In the example illustrated in which each fitness facility 1400 has its own computing device 3490, controls server 3496 obtains such belt wear/belt life data from computing devices 3490. In other embodiments where one or more of fitness facilities do not include a dedicated computing device 3490, control server 3496 may communicate directly with individual treadmills to directly obtain such belt wear/belt life data from the treadmills in the fitness facility that does not include a local computing device 3490.

In accordance with the instructions, control server 3496 additionally analyses the belt wear/belt life data to formulate or generate a suggested or recommended distribution change for the treadmills at an individual fitness facility or amongst multiple fitness facilities. In one embodiment, such distribution changes generated by control server 3496 take into account the locations in the fitness facility or facilities that are experiencing the higher levels of usage/belt wear. For example, treadmills next to a particular window, the locker room or a snack bar may experience greater levels of usage and greater rates of belt wear as compared to treadmills at other locations in a fitness facility. In one embodiment, the distribution changes may result in treadmills having newer or less used treadmill belts being relocated to those locutions experiencing higher use to better ensure reliability and user satisfaction at the higher use location or locations in the fitness facility.

In one embodiment, the distribution change generated by control server 3496 is such that belt wear or belt remaining life of treadmills is more uniform (less varied) amongst the treadmills. In one embodiment, the distribution chains are such that the belt wear of treadmills with usage greater than an average usage of it is clearly units at a particular fitness facility or amongst multiple fitness facilities is reduced. In one embodiment, the distribution change additionally takes into account the age of the individual treadmill belt and/or the expiration dates of warranties associated with the treadmill belt to either maximize use of treadmill belts covered under warranty or to delay the date at which belts must be replaced, potentially resulting in larger numbers of particular treadmill belts being replaced at one time to facilitate volume maintenance or belt replacement contracts as well as to reduce installation and setup interruptions. Once the distribution change has been generated by control server 3496, control server 3496 outputs distribution change using output device 3498.

Output device 3498 comprises one or more device configured to present or make available the output of distribution changes to the person or entity owning, operating or managing fitness facilities 3401. In the example illustrated, output device 3498 includes multiple modes for providing such output of distribution change. In a first mode, output device 3498 includes a display, such as a monitor, screen or panel directly connected to control server 3496, wherein the output may be presented on the display. In a second mode, output device 3498 additionally comprises a printing device configured to print a hard copy version of the output of distribution changes. In a third mode, output device 3498 comprises a communication interface configured to communicate electronic data or electronic files representing the output of distribution changes to a remote location via a local area network, the Internet or the like, whereby the owner/operator/manager may access information on a website, at a management facility, on a personal data assistant, on a cell phone or the like. In some embodiments, output device 3498 may include less than all of the above modes.

According to one embodiment, computing device 3404 is additionally configured to implement the distribution changes recommended in the output. In particular, computing device 3404 is configured to receive authorization input from the owner/operator/manager, to verify the owner/operator/manager's credentials, to receive selections from the owner/operator/manager regarding the carrying out of all or portions of the recommended distribution changes and to transfer such distribution change instructions to those individuals responsible for carrying out such distribution changes. For example, in one embodiment, the owner/operator/manager, upon receiving output on website, may be provided with the opportunity to check, highlight, click on or otherwise select one or more of the recommended distribution changes (relocation of treadmills, switching of treadmill locations, purchase of new treadmills to change the composition of treadmill types). In one embodiment, this opportunity may presented only after the identity and credentials of the owner/operator/manager has been verified.

Upon receiving such selections, control server 1496 automatically forwards appropriate instructions to those individuals for carrying out the distribution changes. For example, control server 3496 may electronically forward instructions to a facility manager or person at the facility responsible for treadmill maintenance or set up, instructing the manager a person in relocate or move one or more treadmills. Control server 3496 may also electronically forward purchase orders or requests to those retailers or other treadmill suppliers. As a result, in some embodiments, control server 3496 not only recommends or suggest distribution changes based upon the automatic collection of belt wear/belt remaining life data but also facilitates implementation of such distribution changes.

FIG. 15 illustrates one example of output 3500 provided by control server 3496 based upon or using belt wear/belt life data from treadmills of fitness facilities 3401. As noted above, such output 3500 may be present are communicated using output device 3498 in one of various modes. The distribution changes included in output 3500 are further schematically illustrated as implemented fitness facilities 3400 in broken lines.

Output 3500 includes distribution changes 3502, 3504, 3506, 3508 and 3510. One of distribution changes 3502 recommended by control server 3496 based upon such collected belt wear/belt life data is to switch the locations of treadmills 3416 and 3454 between fitness facilities 3401A and 3401B. This distribution change 3502 is further illustrated by broken line arrows 3512, 3514. As indicated by the usage bars on the treadmills, fitness facility 3401A is experiencing a large usage of treadmills of the type X. The example distribution change 3502 relieves some of the usage pressure in fitness facility 3401 by moving treadmill 3416 which has a high usage state 3600 to fitness facility 3401B while moving treadmill 3454 which has a relatively low cumulative usage state 3602 to fitness facility 3400A. As a result, the collective reliability of the treadmills at facility 3401A where the total usage rate is greater is enhanced.

Distribution change 3504 switches the locations of treadmills 3410 and 3412. This change is further indicated by a broken line arrows 3518, 3520. This change results in the treadmill 3412 having a high usage state at a high usage rate location 3422 being moved to a low usage rate location 3420 and further results in treadmill 3410 having a low usage state at a low usage rate location 1420 being moved to a high usage rate location 3422. As a result, a treadmill with a newer or less used treadmill belt is offered at a location at a higher usage rate, reducing likelihood of reliability issues at the most preferred or higher use location in fitness facility 3401A.

Distribution change 3506 further addresses the high cumulative usage rate of the treadmills at facility 3401A by adding a new treadmill 3524 at a new location 3524, increasing capacity or availability for treadmills at facility 1400A.

Distribution change 3508 adds a new treadmill 3528 at a new location 3529 in facility 3401B. As a result, additional usage capacity is provided to facility 3401B to relieve the high usage rates existing at locations 3482 and 3484.

Distribution change 3510 relocate treadmill 1434 from fitness 3401A to a new location 1530 at fitness facility 3401B. As a result, the excess capacity of low usage state of unit 1434 at the low usage rate of location 3442 is transferred to fitness facility 3401B to address the larger usage demand at facility 3401B.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A treadmill wear monitor comprising:
   a controller to:
   receive samples of electric current draw of a treadmill at different speeds of a treadmill belt of the treadmill;
   differently weigh a value of each sample based on a speed of the treadmill belt at which the value of each sample was obtained; and output a notification signal based on the different weighted values of the samples.

2. The treadmill wear monitor of claim 1, wherein the differently weighting of the values of the samples by the controller comprises partitioning speeds of the treadmill belt into ranges of speeds and assigning a different weighting factor to each of the ranges of speeds.

3. The treadmill wear monitor of claim 2, wherein the different weighting factors assigned to each of the ranges of speeds is based upon a resolution of each of the ranges of speeds, each resolution being based upon a difference between electric current draw of the treadmill when driving a new treadmill belt as compared to when driving a completely worn treadmill belt in need of replacement.

4. The treadmill wear monitor of claim 2, wherein the different weighting factors assigned to each of the ranges of speeds is further based upon an occurrence frequency of each of the ranges of speeds, each occurrence frequency being based upon a number of the samples in each of the ranges of speeds.

5. The treadmill wear monitor of claim 1, wherein values for samples of electric current draw received while the treadmill below is at a speed of less than 5 mph are weighted by the controller by a first weighting factor and wherein values for samples of electric current draw received while the treadmill belt is at a speed of greater than 7 mph are weighted by the controller by a second weighting factor that is greater than the first weighting factor.

6. The treadmill wear monitor of claim 1, wherein the controller is to further:
group values for samples of electric current draw during a predefined time interval of at least two seconds into groups; and
derive a statistical value for each group from the values for the electric current draw in each group, wherein the belt wear notification is based upon the statistical value for each of the groups.

7. The treadmill wear monitor of claim 1, wherein the controller is to further:
partition speeds of the treadmill belt into ranges of speeds;
store values of the samples within each range of speed from a plurality of different workouts; and
derive a statistical value for the values for the electric current draw in each range of speed from the plurality of different workouts, wherein the belt wear notification is based upon the statistical value for each of the ranges of speed.

8. The treadmill wear monitor of claim 1, wherein the values of the samples of electric current draw are differently weighted based upon an incline setting of the treadmill belt at which the value of each sample was obtained.

9. The treadmill wear monitor of claim 1, wherein the belt wear notification is not based upon samples of electric current draw taken at an incline setting of the treadmill belt other than zero.

10. The treadmill wear monitor of claim 1, wherein the controller is further to determine the presence of a runner on the treadmill belt, wherein the belt wear notification is not based upon samples of electric current draw taken in absence of a runner on the treadmill belt.

11. The treadmill wear monitor of claim 1, wherein the controller is further to:
partition speeds of the treadmill belt into ranges of speeds;
store values of the samples within each range of speed from a plurality of different workouts; and
derive a statistical value for the values for the electric current draw and range of speed from the plurality of different workouts, wherein the belt wear notification is based upon the statistical value for each of ranges of speed.

12. The treadmill wear monitor of claim 1, wherein the controller is to output the belt wear notification based upon different weighted values of the samples from a plurality of workouts on the treadmill and is to differently weight the values for the samples based upon an age of the samples.

13. The treadmill wear monitor of claim 1, wherein the controller is to output the belt wear notification based upon different weighted values of the samples from a predefined number of workouts, wherein the workouts upon which out of the belt wear notification is based are selected on a first in first out basis.

14. The treadmill wear monitor of claim 1, wherein the output is additionally based upon service conditions other than belt wear.

15. The treadmill wear monitor of claim 1, wherein the controller is incorporated as part of the treadmill.

16. The treadmill wear monitor of claim 1, further comprising a wear indicator, the wear indicator providing a visible indication based at least in part upon the belt wear notification signal.

17. The treadmill wear monitor of claim 16, wherein the wear indicator is incorporated as part of the treadmill.

18. A treadmill comprising:
a controller to:
receive and store first samples of electric current draw from a first workout on the treadmill;
receive and store second samples of electric current draw of the treadmill from a second workout on the treadmill; and
output a notification based on the first stored samples and the second stored samples.

19. The treadmill monitor of claim 18, wherein the controller outputs the notification based upon a combination of (a) the different weighted values of the samples and (b) a second service condition of the treadmill that is independent of the first service condition.

20. A treadmill monitor comprising:
a controller to:
maintain a workout array, the workout array comprising an array of a predefined number of workouts, each of the workouts comprising a weighted average of amperage values received from an electric current sensor of a treadmill for each of a plurality of speed ranges, wherein for each new workout added to the workout array, an oldest workout is removed; and
output a notification based on an aggregation of the weighted average of amperage values for the plurality of speed ranges of the workout array.

* * * * *